(12) United States Patent
Takematsu et al.

(10) Patent No.: US 7,697,731 B2
(45) Date of Patent: Apr. 13, 2010

(54) INFORMATION-PROCESSING APPARATUS, INFORMATION-PROCESSING METHODS, AND PROGRAMS

(75) Inventors: Katsuhiro Takematsu, Kanagawa (JP); Tomohiko Gotoh, Kanagawa (JP); Yoshihiro Yamaguchi, Tokyo (JP); Tamaki Kojima, Tokyo (JP)

(73) Assignee: Sony Corporation, Tokyo (JP)

( * ) Notice: Subject to any disclaimer, the term of this patent is extended or adjusted under 35 U.S.C. 154(b) by 555 days.

(21) Appl. No.: 11/170,327

(22) Filed: Jun. 29, 2005

(65) Prior Publication Data

US 2006/0039586 A1 Feb. 23, 2006

(30) Foreign Application Priority Data

Jul. 1, 2004 (JP) .............................. 2004-195219

(51) Int. Cl.
*G06K 9/00* (2006.01)
*G06K 9/62* (2006.01)
*G06K 9/54* (2006.01)
*G06F 7/00* (2006.01)
*G06F 17/30* (2006.01)

(52) U.S. Cl. ....................... 382/115; 382/224; 382/305; 707/6; 707/4

(58) Field of Classification Search ................. 382/100, 382/115, 118, 190, 206, 229, 305; 707/4, 707/5, 6
See application file for complete search history.

(56) References Cited

U.S. PATENT DOCUMENTS

| 5,144,685 | A | * | 9/1992 | Nasar et al. ................. 382/153 |
| 5,819,288 | A | * | 10/1998 | De Bonet ........................ 707/2 |
| 5,893,095 | A | * | 4/1999 | Jain et al. ....................... 707/6 |
| 6,023,241 | A | * | 2/2000 | Clapper ................. 342/357.13 |
| 6,526,351 | B2 | * | 2/2003 | Whitham ..................... 701/211 |
| 6,804,684 | B2 | * | 10/2004 | Stubler et al. ............ 707/104.1 |
| 6,922,489 | B2 | * | 7/2005 | Lennon et al. .............. 382/228 |
| 6,970,189 | B1 | * | 11/2005 | Bernstein et al. ......... 348/211.2 |
| 7,031,555 | B2 | * | 4/2006 | Troyanker ................... 382/305 |
| 7,289,812 | B1 | * | 10/2007 | Roberts et al. ........... 455/456.1 |
| 2002/0136433 | A1 | * | 9/2002 | Lin ............................. 382/118 |
| 2005/0078174 | A1 | * | 4/2005 | Casey et al. ................... 348/61 |

FOREIGN PATENT DOCUMENTS

| JP | 2000-207019 | 7/2000 |
| JP | 2002-269146 | 9/2002 |
| JP | 2004-21677 | 1/2004 |
| WO | WO 2004/019225 | 3/2004 |

* cited by examiner

*Primary Examiner*—Bhavesh M Mehta
*Assistant Examiner*—Michael A Newman
(74) *Attorney, Agent, or Firm*—Oblon, Spivak, McClelland, Maier & Neustadt, L.L.P.

(57) ABSTRACT

The present invention provides an information-processing apparatus including detection means, recognition means, and meta-information generation means. The detection means detects conditions surrounding the user and generates sensing data revealing the conditions surrounding the user. The recognition means recognizes the conditions surrounding the user on the basis of the sensing data. The meta-information generation means generates meta information in the form of structured information to be used for detecting a change in the conditions surrounding the user on the basis of one or more pieces of the sensing data and recognition information showing a recognition result produced by the condition recognition means.

18 Claims, 12 Drawing Sheets

FIG. 4

| ITEM | INFORMATION INCLUDED IN ITEM |
|---|---|
| Person | INFORMATION RELATED TO USER RECOGNIZED IN FACE RECOGNITION PROCESSING |
| Leitmotif | INFORMATION RELATED TO SPOKEN WORDS RECOGNIZED IN AUDIO RECOGNITION PROCESSING |
| Location | INFORMATION RELATED TO LOCATION RECOGNIZED IN IMAGE RECOGNITION PROCESSING |
| Time | PRESENT TIME |

FIG. 5

| UPPER-LEVEL ITEM | ITEM | INFORMATION INCLUDED IN ITEM |
|---|---|---|
| Person, Leitmotif, Location | Prospect | INFORMATION ON ONE OF CANDIDATES RECOGNIZED AS PROCESSING RESULT |
| Prospect | Score | SCORE |
| Location | Latitude | MEASURED LATITUDE |
| Location | Longitude | MEASURED LONGITUDE |

FIG. 6

```
<?xml version="1.0" encoding="UFT-8" ?>
<Preson>
    <Prospect> 75 <Score> 0.4235989 </Score> </Prospect>
    <Prospect> 03 <Score> 0.6628738 </Score> </Prospect>
<?Person>
<Leitmotif>
    <Prospect> DRAGON RADAR <Score> 0.44827411 </Score> </Prospect>
    <Prospect> PHILADELPHIA <Score> 0.9987236 </Score> <Prospect>
</Leitmotif>
<Location>
    <Latitude> 35 37.2217,N</Latitude>
    <Longitude> 139 44.2383,E </Logitude>
    <Prospect> B9 CONFERENCE OF SECOND BUILDING <Score> 0.2629673 </Score> </Prospect>
    <Prospect> GANDHARA CONFERENCE ROOM <Score> 0.8659298 </Score> </Prospect>
</Location>
<time>03-08-29-16:47</time>
```

FIG. 9

| ITEM | INFORMATION INCLUDED IN ITEM |
|---|---|
| Factor | INFORMATION INCLUDED IN FILE |
| Guid | NUMBER IDENTIFYING CONTENT FILE |
| Filepath | PATH SHOWING RECORDING ADDRESS OF CONTENT FILE |
| Type | CONTENT-FILE TYPE |
| Event | INFORMATION INCLUDED IN SCHEDULE DATA |

FIG. 10

```xml
<?xml version="1.0" encoding="UFT-8" ?>
<Factor>
    <Guid>{3090B941-751B-403f-A224-4C49661669B3}</Guid>
    <FilePath thumbnail="d:¥EQ-Data¥thumbnail¥photo002.jpg">d:¥EQ-Data¥photo002.jpg</FilePath>
    <Type>Photo</Type>
    <Person>
        <Prospect> 75<Score> 0.4235989 </Score> </Prospect>
        <Prospect> 03<Score> 0.6628738 </Score> </Prospect>
    </Person>
    <Leitmotif>
        <Prospect> DRAGON RADAR <Score> 0.44827411 </Score> </Prospect>
        <Prospect> PHILADELPHIA <Score> 0.9987236 </Score> </Prospect>
    </Leitmotif>
    <Location>
        <Latitude> 35 37.2217,N</Latitude>
        <Logitude> 139 44.2383,E </Logitude>
        <Prospect> B9 CONFERENCE OF SECOND BUILDING <Score> 0.2629673 </Score> </Prospect>
        <Prospect> GANDHARA CONFERENCE ROOM <Score> 0.8659298 </Score> </Prospect>
    </Location>
    <event>AUGUST CONFERENCE OF FIRST DEPARTMENT OF SECOND DIVISION @ GANDHARA CONFERENCE ROOM </event>
    <time>03-08-29-16:47</time>
</factor>
```

| SEARCH KEY | WEIGHT |
|---|---|
| USER A | 0.4 |
| USER B | 0.2 |
| HOME | 0.2 |
| NIGHT | 0.2 |

INFORMATION-PROCESSING APPARATUS, INFORMATION-PROCESSING METHODS, AND PROGRAMS

BACKGROUND OF THE INVENTION

The present invention relates to an information-processing apparatus, an information-processing method, and a program. More particularly, the present invention relates to an information-processing apparatus, an information-processing method, and a program capable of presenting a content according to conditions surrounding the user.

Operations to search a database for data to be displayed have been becoming widely known and popular. The database is used for storing data referred properly to hereafter as content files such as a still-image file, a moving-image file, and an audio file. In an operation to search a database for desired data, the user enters a keyword related to the desired data.

An information-processing apparatus in related art for searching a database for desired data as described above infers a context existing at a time of acquiring image data on the basis of attributes of the image data given as a content file in order to classify the image data. For more information, refer to documents such as Japanese Patent Laid-open No. 2002-10178, which is referred to hereafter as patent document 1. In this information-processing apparatus, a rule base inference engine infers a context, which is very likely a context of image data, on the basis of a date, a result of indoor/outdoor determination, data stored in a family-information database and data stored in a seasonal-event/social-custom database.

In addition, a moving image similar to a moving image specified by the user is searched for by comparison of meta information of an object of interest with meta information stored in a meta-information database. For more information, refer to documents such as Japanese Patent Laid-open No. 2001-134589, which is referred to hereafter as patent document 2.

Furthermore, documents such as Japanese Patent Laid-open No. Hei 8-195825 discloses an apparatus for generating data of a moving image. This apparatus detects an abnormal state on the basis of moving-image data corresponding to an image taken by a video camera and data generated by a sensor. When an abnormal state is detected, this apparatus transmits moving-image data corresponding to images taken before and after the detection of the abnormal state to a remote center along with corresponding data. The document describing this apparatus is referred to hereafter as patent document 3.

SUMMARY OF THE INVENTION

In the technologies disclosed in patent documents 1 to 3 cited above, however, while a database can be searched for a content file corresponding to a keyword entered by the user, if the user does not make a request for a search operation, the information-processing apparatus according to the technologies are not capable of searching a database for a content file even if a change in aforementioned conditions surrounding the user exists and, hence, not capable of presenting a content of the file found in the search to the user.

Thus, the information-processing apparatus have a problem of inability to search a database for a content file due to the fact that the user does not know a keyword to be entered because the user itself does not well remember necessary information.

Addressing the problem described above, inventors of the present invention have devised an information-processing apparatus capable of searching a database for a content file according to conditions surrounding the user so as to keep up with changes in aforementioned conditions surrounding the user.

In accordance with an embodiment of the present invention, there is provided an information-processing apparatus including:

detection means for detecting conditions surrounding the user and generating sensing data revealing the conditions surrounding the user;

recognition means for recognizing the conditions surrounding the user on the basis of the sensing data; and meta-information generation means for generating meta information in the form of structured information to be used for detecting a change in the conditions surrounding the user on the basis of one or more pieces of the sensing data and recognition information showing a recognition result produced by the condition recognition means.

The information-processing apparatus may further include:

content-data storage means for temporarily storing content data as data corresponding to the sensing data and also as data representing the conditions surrounding the user;

determination means for producing a result of determination as to whether or not the conditions surrounding the user have changed on the basis of the recognition information; and content-file generation means for generating a content file to be used for displaying or reproducing any ones of a still image, a moving image, and an audio signal, which each record the conditions surrounding the user, on the basis of the stored content data in the case of the determination result indicating a change in the conditions surrounding the user.

The information-processing apparatus may further include content-file-recording means for recording a content file by associating the recorded content file with the meta information.

The meta-information generation means may generate meta information as structured information, which includes certainty-factor information showing the degree of certainty of the recognition information and is used for detecting a change in the conditions surrounding the user, on the basis of one or more pieces of sensing data and the recognition information showing a recognition result produced by the condition recognition means.

The information-processing apparatus may further include:

determination means for producing a result of determination as to whether or not the conditions surrounding the user have changed on the basis of the recognition information included in the meta information;

weight computation means for computing a weight representing the priority level of the recognition information on the basis of the certainty-factor information; and search means for carrying out a weighted search operation to search for a content file, which is to be used for reproducing or displaying a still image, a moving image, or an audio signal for recording the conditions surrounding the user and used for recording past conditions surrounding the user as conditions similar to present conditions surrounding the user, on the basis of the recognition information and the weight of the recognition information in the case of the determination result indicating a change in the conditions surrounding the user.

The determination means may produce a result of determination as to whether or not the conditions surrounding the user have changed by comparing recognition information included in first meta information with recognition information included in second meta information generated right before the first meta information and using a change of the recognition information included in the first meta information as a basis of the determination. The weight computation means may compute a weight representing the priority level of recognition information on the basis of the certainty-factor information and the magnitude of the change in the recognition information.

The information-processing apparatus may further include display means for displaying a still or moving image for a detected content file on the basis of the content file. If the user selects the still or moving image displayed by the display means, the search means further searches for a content file having meta information, which is associated with the content file, similar to the detected content file for the selected still or moving image on the basis of the detected content file for the selected still or moving image.

The information-processing apparatus may further include display means for displaying still or moving images for a detected content file in an order predetermined on the basis of the weight of the content file. In this case, the search means may further compute the weight representing the priority level of the detected content file on the basis of a search result.

In accordance with another embodiment of the present invention, there is provided an information-processing method including the steps of:

detecting conditions surrounding the user and controlling generation of sensing data revealing the detected conditions surrounding the user;

recognizing the detected conditions surrounding the user on the basis of the sensing data; and generating meta information in the form of structured information to be used for detecting a change in the conditions surrounding the user on the basis of one or more pieces of sensing data and recognition information obtained as a recognition result produced by condition recognition means.

In accordance with a further embodiment of the present invention, there is provided a program to be executed by a computer. The program is includes the steps of:

detecting conditions surrounding the user and controlling generation of sensing data revealing the detected conditions surrounding the user;

recognizing the detected conditions surrounding the user on the basis of the sensing data; and generating meta information in the form of structured information to be used for detecting a change in the conditions surrounding the user on the basis of one or more pieces of sensing data and recognition information obtained as a recognition result produced by condition recognition means.

According to the information-processing apparatus, the information-processing method, and the program, which are provided in accordance with embodiments of the present invention, conditions surrounding the user are detected, sensing data revealing the detected conditions surrounding the user is generated, and the conditions surrounding the user are recognized. Then, meta information is generated as structured information to be used for detecting a change in aforementioned conditions surrounding the user on the basis of one or more pieces of sensing data and recognition information obtained as a recognition result produced by the condition recognition means.

According to the present invention, in accordance with a change in conditions surrounding the user, a content file can be searched for to make it possible to provide the user with a content suitable for the conditions surrounding the user.

BRIEF DESCRIPTION OF THE DRAWINGS

These and other objects of the invention will be seen by reference to the description, taken in connection with the accompanying drawings, in which:

FIG. 4 is an explanatory diagram showing information included in meta information;

FIG. 5 is an explanatory diagram showing information included in meta information;

FIG. 6 is a diagram showing an example of meta information;

FIG. 9 is an explanatory diagram showing information included in meta information;

FIG. 10 is an explanatory diagram showing meta information;

DETAILED DESCRIPTION OF THE PREFERRED EMBODIMENTS

Before preferred embodiments of the present invention are explained, relations between disclosed inventions and the embodiments are explained in the following comparative description. It is to be noted that, even if there is an embodiment described in this specification but not included in the following comparative description as an embodiment corresponding to an invention, such an embodiment is not to be interpreted as an embodiment not corresponding to an invention. Conversely, an embodiment included in the following comparative description as an embodiment corresponding to a specific invention is not to be interpreted as an embodiment not corresponding to an invention other than the specific invention.

In addition, the following comparative description is not to be interpreted as a comprehensive description covering all inventions disclosed in this specification. In other words, the following comparative description by no means denies existence of inventions disclosed in this specification but not included in claims as inventions for which a patent application is filed. That is to say, the following comparative description by no means denies existence of inventions to be included in a separate application for a patent, included in an amendment to this specification or added in the future.

Figure 2:
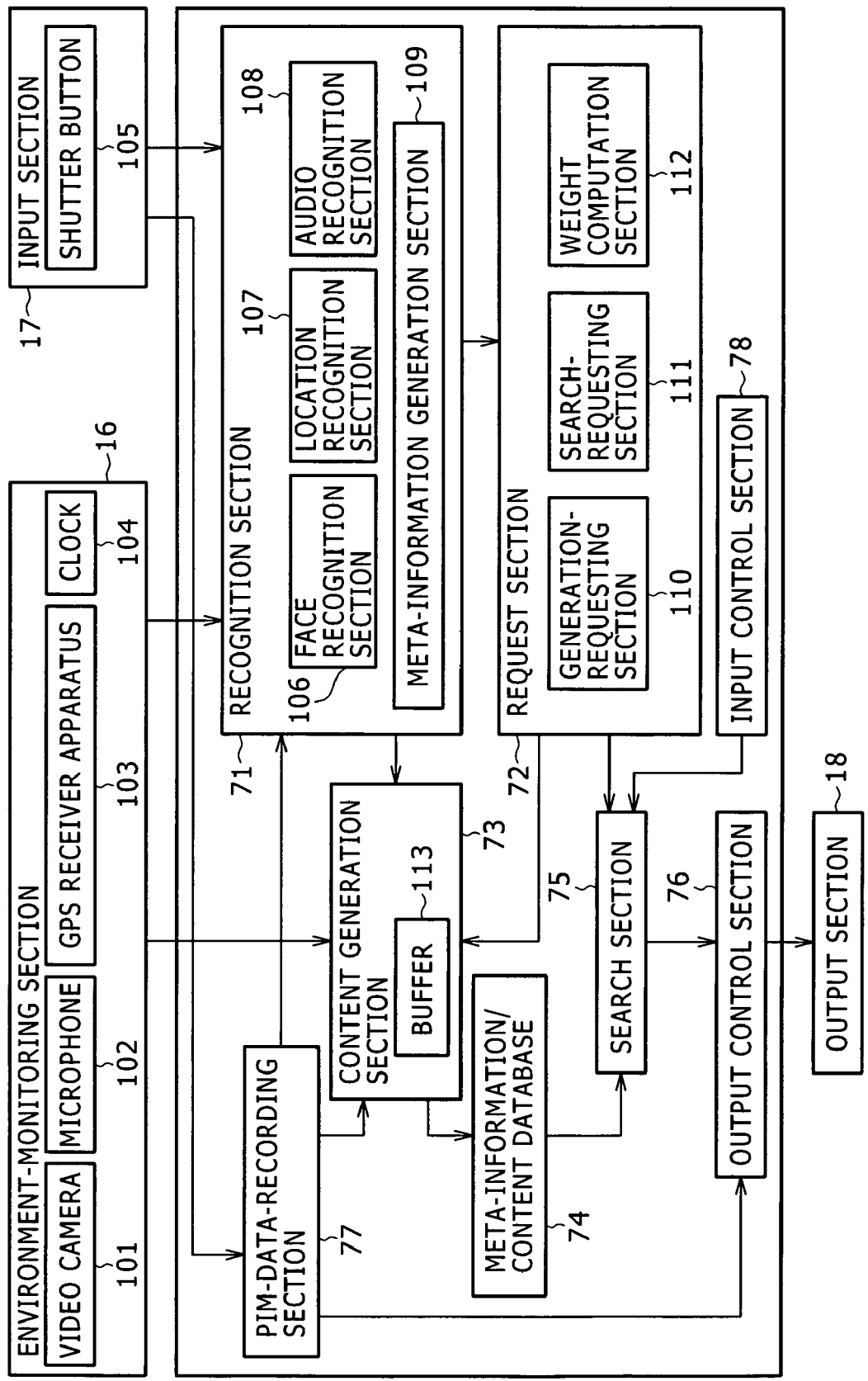
FIG. 2 is a block diagram showing the functional configuration of the information-processing apparatus according to an embodiment of the present invention.

An information-processing apparatus according to an embodiment of the present invention includes:

detection means (such as an environment-monitoring section 16 and an input section 17, which are shown in FIG. 2) for detecting conditions surrounding the user and generating sensing data revealing the conditions surrounding the user;

recognition means (such as a face recognition section 106, a location recognition section 107, and an audio recognition section 108, which are shown in FIG. 2) for recognizing the conditions surrounding the user on the basis of the sensing data; and meta-information generation means (such as a meta-information generation section 109 shown in FIG. 2) for generating meta information in the form of structured information to be used for detecting a change in the conditions surrounding the user on the basis of one or more pieces of the sensing data and recognition information showing a recognition result produced by the condition recognition means.

The information-processing apparatus according to an embodiment of the present invention further includes:

content-data storage means (such as a buffer 113 shown in FIG. 2) for temporarily storing content data as data corresponding to the sensing data also as data representing the conditions surrounding the user;

determination means (such as a request section 72 shown in FIG. 2) for producing a result of determination as to whether or not the conditions surrounding the user have changed on the basis of the recognition information; and content-file generation means (such as a content generation section 73 shown in FIG. 2) for generating a content file to be used for displaying or reproducing any ones of a still image, a moving image, and an audio signal, which each record the conditions surrounding the user, on the basis of the stored content data in the case of the determination result indicating a change in the conditions surrounding the user.

The information-processing apparatus according to an embodiment of the present invention further includes content-file-recording means (such as a meta-information/content database 74 shown in FIG. 2) for recording the content file by associating the content file with the meta information.

In the information-processing apparatus according to an embodiment of the present invention, the meta-information generation means (such as the meta-information generation section 109 shown in FIG. 2) generates meta information as structured information, which includes certainty-factor information showing the degree of certainty of the recognition information and is used for detecting a change in the conditions surrounding the user, on the basis of one or more pieces of sensing data and the recognition information showing a recognition result produced by the condition recognition means (such as the face recognition section 106, the location recognition section 107, and the audio recognition section 108, which are shown in FIG. 2).

The information-processing apparatus according to an embodiment of the present invention further includes:

condition-change determination means (such as the request section 72 shown in FIG. 2) for producing a result of determination as to whether or not the conditions surrounding the user have changed on the basis of the recognition information included in the meta information;

weight computation means (such as a weight computation section 112 shown in FIG. 2) for computing a weight representing the priority level of the recognition information on the basis of the certainty-factor information; and content-file search means (such as a search section 75 shown in FIG. 2) for carrying out a weighted search operation to search for a content file, which is to be used for reproducing or displaying a still image, a moving image, or an audio signal for recording the conditions surrounding the user and used for recording past conditions surrounding the user as conditions similar to present conditions surrounding the user, on the basis of the recognition information and the weight of the recognition information in the case of the determination result indicating a change in the conditions surrounding the user.

In the information-processing apparatus according to an embodiment of the present invention:

the determination means (such as a request section 72 shown in FIG. 2) produces a result of determination as to whether or not the conditions surrounding the user have changed by comparing recognition information included in first meta information with recognition information included in second meta information generated right before the first meta information and using a change of the recognition information included in the first meta information as a basis of the determination; and the weight computation means (such as a weight computation section 112 shown in FIG. 2) computes a weight representing the priority level of recognition information on the basis of the certainty-factor information and the magnitude of the change in the recognition information.

The information-processing apparatus according to an embodiment of the present invention further includes image display means (such as an output section 18 shown in FIG. 2) for displaying a still or moving image for a detected content file on the basis of the content file. If the user selects the still or moving image displayed by the display means, the search means (such as the search section 75 shown in FIG. 2) further searches for a content file having meta information, which is associated with the content file, similar to the detected content file for the selected still or moving image on the basis of the selected content file for the selected still or moving image.

The information-processing apparatus according to an embodiment of the present invention further includes image display means (such as the output section 18 shown in FIG. 2) for displaying still or moving images for a detected content file in an order predetermined on the basis of the weight of the content file. The search means (such as the search section 75 shown in FIG. 2) computes the weight representing the priority level of the detected content file on the basis of a search result.

Figure 3:
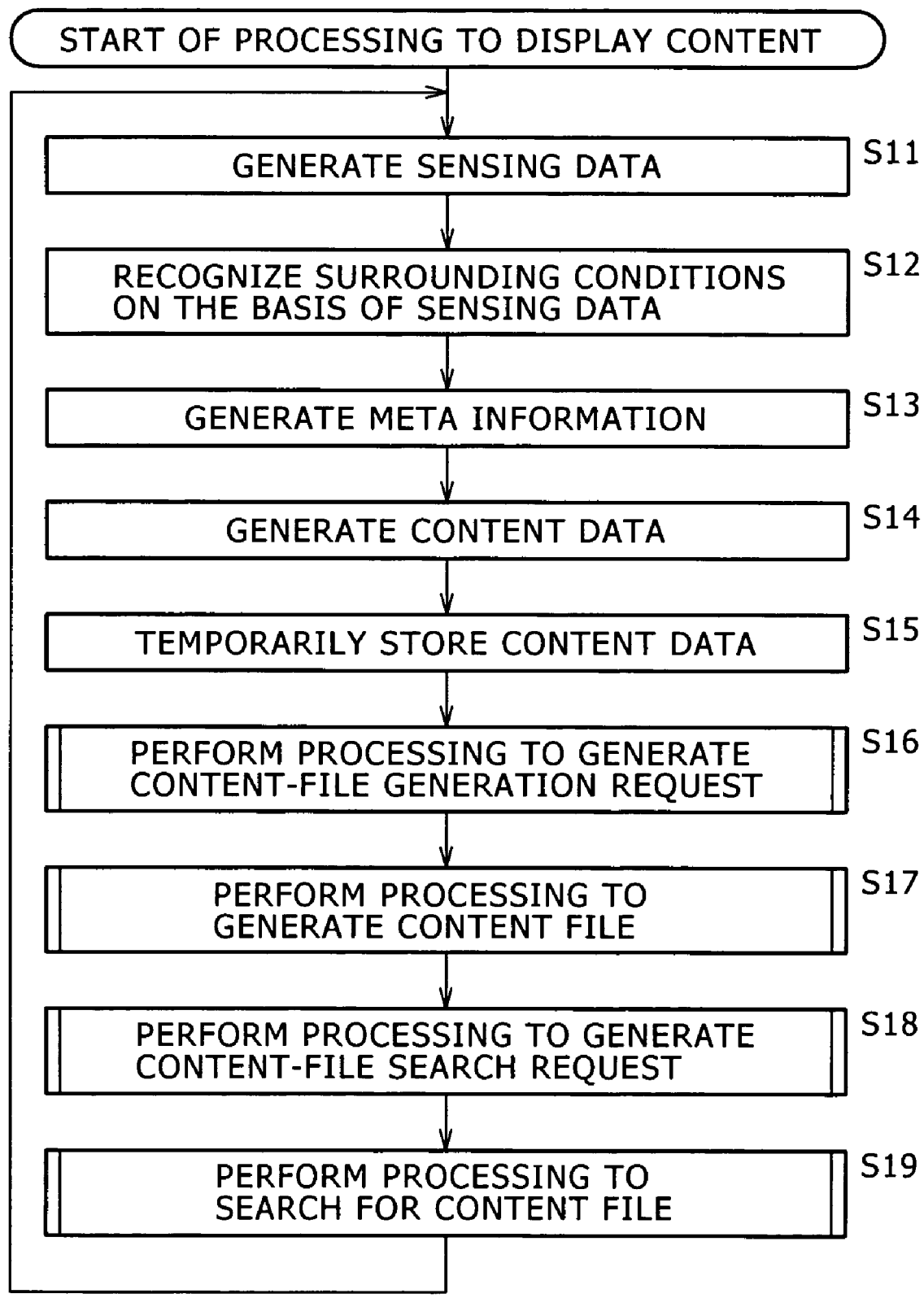
FIG. 3 shows a flowchart referred to in explanation of processing carried out by the information-processing apparatus to display a content.

An information-processing method according to an embodiment of the present invention includes the steps of:

detecting conditions surrounding the user and controlling generation of sensing data revealing the detected conditions surrounding the user (for example, a process carried out at a step S11 of a flowchart shown in FIG. 3);

recognizing the detected conditions surrounding the user on the basis of the sensing data (for example, a process carried out at a step S12 of the flowchart shown in FIG. 3); and generating meta information in the form of structured information to be used for detecting a change in the conditions surrounding the user (for example, a process carried out at a step S13 of the flowchart shown in FIG. 3) on the basis of one or more pieces of sensing data and recognition information obtained as a recognition result produced by condition recognition means (such as the face recognition section 106, the location recognition section 107, and the audio recognition section 108, which are shown in FIG. 2).

Since a program is executed to carry out basically the same processing as that carried out by adoption of the information-processing method, the explanation of the program is not repeated to avoid a duplication.

The present invention can be applied to apparatus such as a personal computer, a PDA (Personal Digital Assistance), and a portable terminal.

Figure 1:
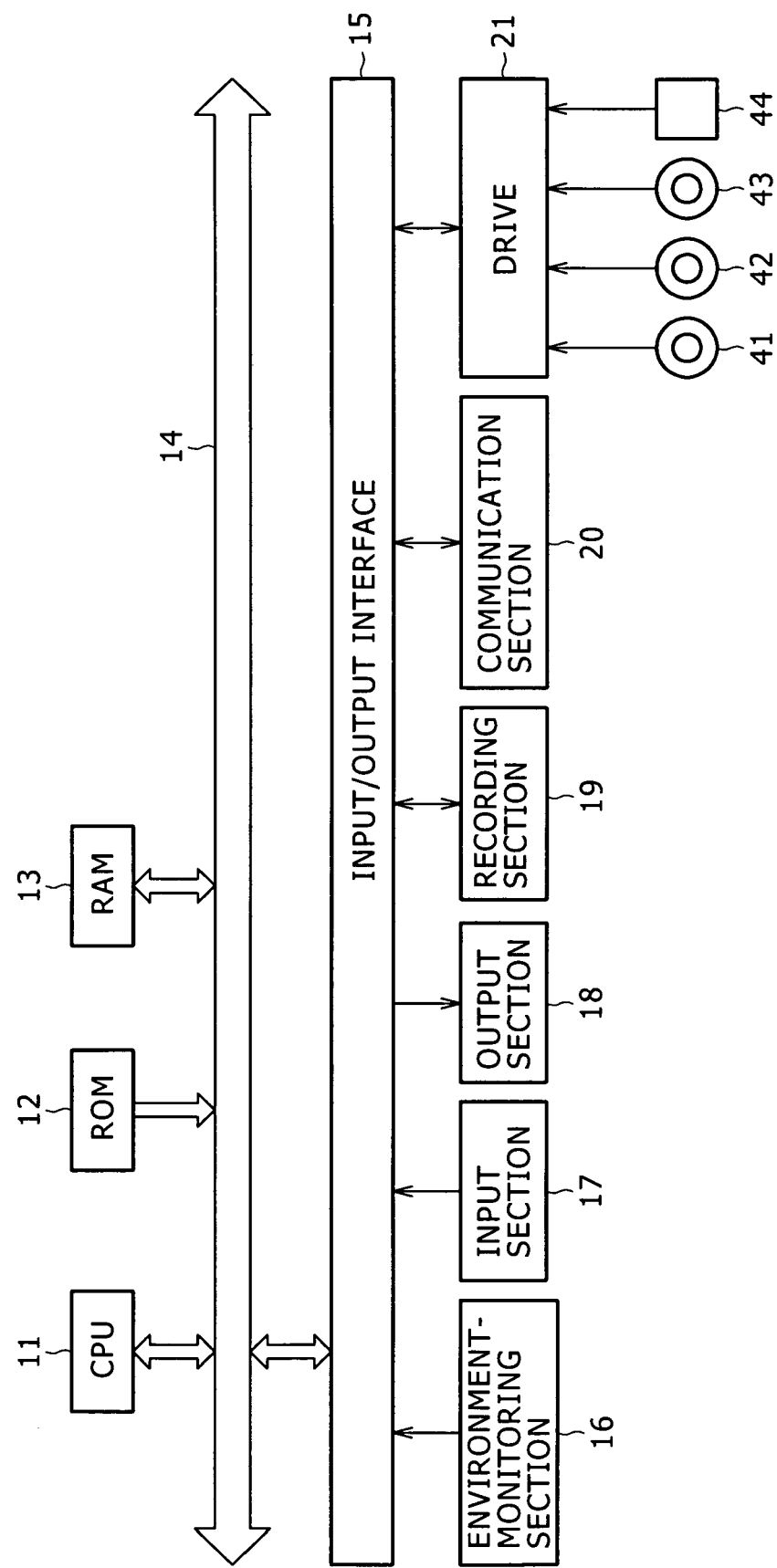
FIG. 1 is a block diagram showing a typical configuration of an information-processing apparatus according to an embodiment of the present invention.

FIG. 1 is a block diagram showing a typical configuration of an information-processing apparatus according to an embodiment of the present invention.

A CPU 11 carries out various kinds of processing by execution of a variety of programs stored in a ROM (Read Only Memory) 12 or a recording section 19. A RAM (Random Access Memory) 13 is used for properly storing, among other information, the programs to be executed by the CPU 11 and data. The CPU 11, the ROM 12, and the RAM 13 are connected to each other by a bus 14.

The CPU 11 is also connected to an input/output interface 15 by the bus 14. The input/output interface 15 is connected to an environment-monitoring section 16, an input section 17, and an output section 18. The environment-monitoring section 16 includes a video camera, a microphone, a GPS (Global Positioning System) receiver apparatus, and a clock. The input section 17 has a keyboard, a mouse, switches, and a camera. The output section 18 includes a display, a speaker, and lamps. The CPU 11 carries out various kinds of processing in accordance with an input received from the environment-monitoring section 16 or a command entered via the input section 17.

A recording section 19 connected to the input/output interface 15 includes components such as a hard disk used for storing programs to be executed by the CPU 11 and various kinds of data. A communication section 20 is a component for communicating with external apparatus through a communication network such as the Internet and another network.

The communication section 20 may acquire a program through the communication network and store the acquired program in the recording section 19.

When a recording medium is mounted on a drive 21 also connected to the input/output interface 15, the drive 21 drives the recording medium to acquire a program or data from the recording medium, which can be a magnetic disk 41, an optical disk 42, a magneto-optical disk 43, and a semiconductor memory 44. If necessary, the drive 21 transfers the required program or data to the recording section 19 to be stored therein.

FIG. 2 is a block diagram showing the functional configuration of the information-processing apparatus.

As shown in the figure, the information-processing apparatus includes the environment-monitoring section 16, the input section 17, the output section 18, a recognition section 71, a request section 72, a content generation section 73, a meta-information/content database 74, a search section 75, an output control section 76, a PIM (Personal Information Manager) data-recording section 77, and an input control section 78.

The environment-monitoring section 16 is a unit for monitoring a condition such as the present time, the present position of the user, and a state as to whether or not the user is making a statement as a condition representing an environment surrounding the user, for detecting the situation surrounding the user and generating sensing data showing the situation surrounding the user. The environment-monitoring section 16 supplies the generated sensing data to the recognition section 71.

In addition, the environment-monitoring section 16 also generates content data showing situations surrounding the user and supplies the generated content data to the content generation section 73. The content data is data similar to the sensing data cited above. Typically, the content data has a quality higher than that of the sensing data. If the environment-monitoring section 16 generates still-image data as sensing data, for example, the environment-monitoring section 16 generates, as content data corresponding to the sensing data, still-image data having a resolution and a quality higher than the sensing data. In other words, the content data is still-image data for representing a still image pertaining to a category of the same contents as an image data displayed on the basis of the sensing data. The still image data has a resolution and a quality higher than the image data displayed on the basis of the sensing data. It is to be noted that, as content data, the same data as the sensing data can also be used.

In addition, the sensing data can be any data as long as the data has a quality of an order allowing situations surrounding the user to be recognized. Thus, sensing data can be generated as moving-image data obtained by discretely reducing frames of moving-image data representing content data. As an alternative, sensing data can be generated as still-image data obtained by discretely reducing pixels of still-image data representing content data.

The environment-monitoring section 16 has a video camera 101, a microphone 102, a GPS (Global Positioning System) receiver apparatus 103 and a clock 104.

The video camera 101 employed in the environment-monitoring section 16 is a component for taking a picture of an environment (or conditions) surrounding the information-processing apparatus. That is to say, the video camera 101 is a component for taking a picture of situations surrounding the user. The environment-monitoring section 16 then generates moving-image data for a moving image, the picture of which has been taken. The environment-monitoring section 16 generates sensing data on the basis of the moving-image data generated by the video camera 101 employed in the environment-monitoring section 16 and supplies the generated sensing data to the recognition section 71. For example, the environment-monitoring section 16 generates still-image data as the sensing data on the basis of the moving-image data generated by the video camera 101 employed in the environment-monitoring section 16 and supplies the generated sensing data to the recognition section 71.

In addition, the environment-monitoring section 16 also generates content data on the basis of the moving-image data generated by the video camera 101 employed in the environment-monitoring section 16 and supplies the generated content data to the content generation section 73. For example, the environment-monitoring section 16 generates still-image data as the content data on the basis of the moving-image data generated by the video camera 101 employed in the environment-monitoring section 16 and supplies the generated content data to the content generation section 73.

In addition, as another example, the environment-monitoring section 16 generates moving-image data as the content data on the basis of the moving-image data generated by the video camera 101 employed in the environment-monitoring section 16 and supplies the generated content data to the content generation section 73.

The microphone 102 employed in the environment-monitoring section 16 is a component for acquiring a sound generated in the surroundings of the information-processing apparatus or the surroundings of the user and converting the acquired sound into an electrical signal representing audio data of the sound. The environment-monitoring section 16 then generates sensing data on the basis of the audio data of the electrical signal obtained as a result of the conversion carried out by the microphone 102 employed in the environment-monitoring section 16 and supplies the generated sensing data to the recognition section 71. For example, the environment-monitoring section 16 generates audio data as the sensing data on the basis of the audio data of the electrical signal obtained as a result of the conversion carried out by the microphone 102 employed in the environment-monitoring section 16 and supplies the generated sensing data to the recognition section 71.

In addition, the environment-monitoring section 16 also generates content data on the basis of the audio data of the electrical signal obtained as a result of the conversion carried out by the microphone 102 employed in the environment-monitoring section 16 and supplies the generated content data to the content generation section 73. For example, the environment-monitoring section 16 generates audio data as content data on the basis of the audio data of the electrical signal obtained as a result of the conversion carried out by the microphone 102 employed in the environment-monitoring section 16 and supplies the generated content data to the content generation section 73.

The GPS (Global Positioning System) receiver apparatus 103 employed in the environment-monitoring section 16 is a component for receiving information showing the position of an artificial satellite employed in the GPS (Global Positioning System) and information indicating a time of the transmission of the positional information from the artificial satellite and finding the present position of the information-processing apparatus on the basis of the information showing the position of the artificial satellite employed in the GPS and the information indicating a time of the transmission of the positional information. The environment-monitoring section 16 then generates sensing data showing the present position of the information-processing apparatus on the basis of a present position found by the GPS receiver apparatus 103 employed in the environment-monitoring section 16 as the present position of the information-processing apparatus. The generated sensing data is supplied to the recognition section 71. For example, the environment-monitoring section 16 generates the latitude and longitude of the present position of the information-processing apparatus as sensing data on the basis of a present position found by the GPS receiver apparatus 103 employed in the environment-monitoring section 16 as the present position of the information-processing apparatus and supplies the generated sensing data to the recognition section 71.

The clock 104 employed in the environment-monitoring section 16 is a component for measuring time and holding time data, which is data indicating the present date and the present time. The clock 104 employed in the environment-monitoring section 16 is typically a real-time clock. The environment-monitoring section 16 generates sensing data indicating the present date and the present time on the basis of the time data held by the clock 104 and supplies the generated sensing data to the recognition section 71.

The input section 17 is a unit for generating sensing data on the basis of a command entered by the user and supplies the generated sensing data to the recognition section 71. The input section 17 has a shutter button 105.

The shutter button 105 employed in the input section 17 is a button to be pressed for making typically a request for photographing of a still image or a moving image. When the user presses the shutter button 105 employed in the input section 17, the input section 17 generates a signal indicating that the shutter button 105 has been pressed and supplies the signal indicating that the shutter button 105 has been pressed to the recognition section 71 as sensing data.

It is to be noted that, as will be described later in detail in explanation of the shutter button 105, when the shutter button 105 employed in the input section 17 is pressed, the input section 17 generates a signal indicating that the shutter button 105 has been pressed and supplies the signal indicating that the shutter button 105 has been pressed to the recognition section 71 as sensing data.

It is also worth noting that, as will be described later in detail, the recognition section 71 receiving a signal indicating that the shutter button 105 has been pressed generates meta information indicating that the shutter button 105 has been pressed and supplies the generated meta information to the content generation section 73. Receiving the meta information, the content generation section 73 generates a content file containing still-image data extracted from content data supplied by the video camera 101. Thus, when the shutter button 105 is pressed, a content file containing a still-image data is generated. By the same token, when the shutter button 105 is pressed, a content file containing a moving-image data may be generated.

When the user operates the input section 17 to make a request for updating of data recorded in the PIM-data-recording section 77, the input section 17 generates an input signal representing the request and supplies the generated input signal to the PIM-data-recording section 77. Examples of the data to be updated are address data, schedule data, and learning data. The address data is data including the name, address, and telephone number of the user. The schedule data is data including a schedule or plan of the user. The learning data is data used by the recognition section 71 in recognition of the environment surrounding the user. The data recorded in the PIM-data-recording section 77 as the address data, the schedule data, and the learning data is referred to properly as PIM data.

The recognition section 71 is a unit for recognizing the environment surrounding the user on the basis of sensing data received from the environment-monitoring section 16 and the input section 17. Then, the recognition section 71 generates meta information on the basis of a result of the recognition. The meta information is thus generated on the basis of a result of the recognition as information on the environment surrounding the user. It is to be noted that details of the meta information will be described later.

In addition, in this case, the environment surrounding the user is a situation (or a condition) in which the user is present. The information on the environment includes information as to who the user is with, where the user is present, and what conversations the user is having.

The recognition section 71 includes a face recognition section 106, a location recognition section 107, an audio recognition section 108, and a meta-information generation section 109.

The face recognition section 106 employed in the recognition section 71 is a unit for carrying out face recognition processing on the basis of still-image or moving-image data received from the environment-monitoring section 16 as sensing data and learning data received from the PIM-data-recording section 77. That is to say, the face recognition section 106 employed in the recognition section 71 recognizes the face of a person from still-image or moving-image data received from the environment-monitoring section 16 as sensing data and carries out face recognition processing to identify the recognized person so as to determine the person present in the vicinity of the information-processing apparatus.

The learning data includes a user ID (identification), data associated with the user ID and used in the face recognition processing, data showing the name of a location, data associated with data showing the name of the location and used in image recognition processing for identifying the location, and data associated with the user ID and used in audio recognition processing. The user ID is an identification used for identifying persons such as the user, a friend of the user, or a family of the user. An example of the data associated with the user ID and used in the face recognition processing is the ratio of the distance between the left and right eyes to the distance between the eyes and the nose. The face recognition section 106 employed in the recognition section 71 then generates data indicating a result of the face recognition processing. It is to be noted that the result of the face recognition processing includes the user ID used for identifying persons such as the user, a friend of the user, or a family of the user as well as a score indicating the degree of certainty of the result of the face recognition processing.

Thus, typically, the face recognition section 106 employed in the recognition section 71 carries out the face recognition processing when the face recognition section 106 employed in the recognition section 71 receives still-image data from the environment-monitoring section 16 as sensing data and learning data from the PIM-data-recording section 77. Let us assume for example that the face of user A is recognized from the sensing data as a result of the face recognition processing. In this case, the face recognition section 106 employed in the recognition section 71 generates data indicating a result of the face recognition processing from the sensing data as data including a score, which indicates the degree of certainty of the fact that the recognized face is the face of user A.

The location recognition section 107 employed in the recognition section 71 is a unit for carrying out image recognition processing to identify a location on the basis of the sensing data received from the environment-monitoring section 16 and learning data received from the PIM-data-recording section 77. That is to say, the location recognition section 107 employed in the recognition section 71 carries out the image recognition processing to identify the present location of the information-processing apparatus or the present position of the user.

Then, the location recognition section 107 employed in the recognition section 71 generates data representing a result of the image recognition processing. It is to be noted that the data representing a result of the image recognition processing includes a score indicating the degree of certainty of the result of the image recognition processing.

Let us assume for example that the location recognition section 107 employed in the recognition section 71 carries out the image recognition processing to identify a location on the basis of the sensing data received from the environment-monitoring section 16 and learning data received from the PIM-data-recording section 77. Also let us assume that location C is identified from the sensing data as a result of the image recognition processing. In this case, the location recognition section 107 employed in the recognition section 71 generates data indicating the result of the image recognition processing from the sensing data as data including a score, which indicates the degree of certainty of the fact that the recognized location on the basis of the sensing data is location C.

The learning data typically includes still-image data and characteristic quantities. The still-image data is used for displaying still images such as the home and job of the user. The characteristic quantities include information on the luminance and chrominance of pixels in a variety of areas of data representing still images divided into predetermined portions in the areas. The location recognition section 107 employed in the recognition section 71 typically finds the characteristic quantities of the still-image data received from the environment-monitoring section 16 as sensing data and compares the found characteristic quantities with the characteristic quantities of the still-image data included in the learning data in order to carry out the image recognition processing.

The audio recognition section 108 employed in the recognition section 71 is a unit for carrying out audio recognition processing on the basis of the sensing data received from the environment-monitoring section 16 and learning data received from the PIM-data-recording section 77. That is to say, the audio recognition section 108 employed in the recognition section 71 carries out the audio recognition processing to detect and identify words included in a voice spoken at locations surrounding the information-processing apparatus or locations surrounding the user. The audio recognition section 108 employed in the recognition section 71 then generates data representing a result of the audio recognition processing. It is to be noted that the result of the audio recognition processing includes a score, which indicates the degree of certainty of the audio recognition processing.

Let us assume for example that the audio recognition section 108 employed in the recognition section 71 carries out the audio recognition processing on the basis of the sensing data received from the environment-monitoring section 16 and learning data received from the PIM-data-recording section 77. Also let us assume that a word is recognized from the sensing data as a result of the audio recognition processing. In this case, the audio recognition section 108 employed in the recognition section 71 generates data indicating the result of the image recognition processing from the sensing data as data including the recognized word and a score, which indicates the degree of certainty of the fact that the recognized word is a word included in the generated voice.

The meta-information generation section 109 employed in the recognition section 71 is a unit for generating meta information on the basis of sensing data received from the environment-monitoring section 16, sensing data received from the input section 17, data received from the face recognition section 106 employed in the recognition section 71 as a result of the face recognition processing, data received from the location recognition section 107 employed in the recognition section 71 as a result of the image recognition. processing, and data received from the audio recognition section 108 employed in the recognition section 71 as a result of the audio recognition processing, and supplying the generated meta information to the request section 72 and the content generation section 73.

It is to be noted that the meta information includes information related to people, information related to locations, information related to spoken words, and information indicating a time. The information related to people is information including a user ID and a score. The user ID is assigned to a user recognized in the face recognition processing carried out by the recognition section 71. The score represents the degree of certainty of the user recognition performed in the face recognition processing by the recognition section 71. By the same token, the information related to locations is information including a location recognized in the image recognition processing carried out by the recognition section 71 and a score representing the degree of certainty of the location recognition performed in the image recognition processing. Likewise, the information related to spoken words is information including a word recognized in the audio recognition processing carried out by the recognition section 71 and a score representing the degree of certainty of the word recognition performed in the audio recognition processing by the recognition section 71.

The request section 72 is a unit for producing a result of determination as to whether or not the conditions surrounding the user have changed on the basis of the meta information received from the recognition section 71. If a result of the determination indicates that the conditions surrounding the user have changed, the request section 72 generates a content-file generation request as a request for generation of a content file, and supplies the generated request to the content generation section 73.

A content file is data generated by the content generation section 73 on the basis of content data. To be more specific, a content file is data used for displaying or reproducing a content including a moving or still image obtained as a result of taking pictures of the conditions surrounding the user and voices generated at locations surrounding the user. Content files are classified into a photo content file, a sound content file, and a movie content file. The photo content file is still-image data and the sound content file is audio data. The movie content file is moving-image data. On the basis of a content file, a content associated with the content file is displayed on the output section 18 serving as a display unit.

Note that, to put it in detail, if the content file is classified into the sound type, the content is presented to the user by, for example, displaying information on the output section 18 serving as a display unit or reproducing the content file itself, which is audio data as described above. The information displayed on the output section 18 includes the name of the content file and a still image obtained at a time the content file is generated as a still image of the conditions surrounding the user. In the case of reproduction of the content file as audio data, only a portion of the content file can be reproduced. As an alternative, the content file is reproduced by carrying out fade-in and fade-out processes. If the content file classified into the movie type, the content is presented to the user by, for example, displaying a moving image corresponding to the content file on the output section 18 serving as a display unit. As an alternative, the content is presented to the user by, for example, displaying a still image representing the moving image.

In addition, if the determination result produced by the request section 72 indicates that the conditions surrounding the user have changed, the request section 72 generates a content-file search request as a request for an operation to search the meta-information/content database 74 for a content file, and supplies the generated request to the search section 75. The request for an operation to search the meta-information/content database 74 for a content file includes a search key used by the search section 75 as a keyword to carry out the search operation and a weight representing the priority level of the search key. Details of the request for an operation to search the meta-information/content database 74 for a content file will be described later.

If a result of the determination indicates that the conditions surrounding the user have not changed, on the other hand, the request section 72 does not generate the request for generation of a content file and the request for an operation to search the meta-information/content database 74 for a content file.

The request section 72 includes a generation-requesting section 110, a search-requesting section 111, and a weight computation section 112.

The generation-requesting section 110 employed in the request section 72 generates a content-file generation request as a request for generation of a content file when the determination result produced by the request section 72 indicates that the conditions surrounding the user have changed. The request for generation of a content file includes information on a time included in the meta information and information on the type of a content file to be generated. If the determination result produced by the request section 72 indicates that the conditions surrounding the user have not changed, on the other hand, the generation-requesting section 110 employed in the request section 72 does not generate a request for generation of a content file.

When information included in the meta information as the information related to people has changed by inclusion of a user ID not included so far, for example, the determination result produced by the request section 72 indicates that the conditions surrounding the user have changed by appearance of a person identified by the user ID. In this case, the generation-requesting section 110 employed in the request section 72 generates a request for generation of a content file.

The weight computation section 112 employed in the request section 72 computes a weight on the basis of scores included in meta information received from the recognition section 71 when the determination result produced by the request section 72 indicates that the conditions surrounding the user have changed. If the determination result produced by the request section 72 indicates that the conditions surrounding the user have not changed, on the other hand, the weight computation section 112 employed in the request section 72 does not compute a weight.

The search-requesting section 111 employed in the request section 72 generates a content-file search request as a request for an operation to search the meta-information/content database 74 for a content file when the determination result produced by the request section 72 indicates that the conditions surrounding the user have changed. The request for an operation to search the meta-information/content database 74 for a content file includes a search key and a weight computed by the weight computation section 112 employed in the request section 72. The search key includes the name of a user, the name of a location, and a word. The name of a user is information included in the meta information as information related to people. The name of a location is information included in the meta information as information related to locations. The word is information included in the meta information as information related to spoken words. The search-requesting section 111 employed in the request section 72 uses the search key in the operation to search the meta-information/content database 74 for a content file. If the determination result produced by the request section 72 indicates that the conditions surrounding the user have not changed, on the other hand, the search-requesting section 111 employed in the request section 72 does not generate a request for an operation to search the meta-information/content database 74 for a content file.

The content generation section 73 is a unit for generating a content file and meta information having a predetermined format. The content generation section 73 includes a buffer 113.

The buffer 113 employed in the content generation section 73 is a memory used for temporarily storing content data received from the environment-monitoring section 16.

Receiving a request for generation of a content file from the request section 72, the content generation section 73 generates a content file pertaining to a category corresponding to the file type specified in the request for generation of a content file on the basis of content data stored in the buffer 113 employed in the content generation section 73. In the process to generate a content file, the content generation section 73 typically acquires the content data generated at a time also specified in the request for generation of a content file from the buffer 113 employed in the content generation section 73 and, on the basis of the acquired content data, the content generation section 73 generates the content file. If the content generation section 73 does not receive a request for generation of a content file from the request section 72, on the other hand, the content generation section 73 does not generate the content file.

When the content generation section 73 receives a request for generation of a content file from the request section 72, the content generation section 73 acquires meta information generated at a time specified in the request for generation of a content file from the recognition section 71 and refers to schedule data recorded in the PIM-data-recording section 77 to generate meta information with a predetermined format as meta information associated with the content file on the basis of the meta information acquired from the recognition section 71. The time specified in the request for generation of a content file is the present time included in the request. If the content generation section 73 does not receive a request for generation of a content file from the request section 72, on the other hand, the content generation section 73 does not generate the content file.

The content generation section 73 supplies the generated content file and the generated meta information to the meta-information/content database 74.

The meta-information/content database 74 is a memory used for storing the content file and the meta information, which have been generated and supplied by the content generation section 73, by associating the stored content file and meta information with each other. The meta-information/content database 74 is typically a predetermined area included in the recording section 19, which is a hard disk. The area is used for storing meta information and content files. The search section 75 searches the meta-information/content database 74 for a desired content file. The stored content file and meta information are associated with each other typically by storing them in one folder or by assigning a pointer to one of them as a pointer pointing to the other of them.

Receiving a request for an operation to search the meta-information/content database 74 for a content file from the request section 72, the search section 75 refers to meta information stored in the meta-information/content database 74 to carry out a weighted search operation to search the meta-information/content database 74 for the content file on the basis of a search key and the weight of the search key, which are included in the search request. On the basis of the content file found in the weighted search operation, the goodness of fit between the content file and the search key, and the weight of the search key, the search section 75 computes the weight of the content file found in the weighted search operation and generates data to be used for displaying the computed weight. Then, the search section 75 acquires the content file found in the weighted search operation from the meta-information/content database 74 and supplies the acquired content file as well as the generated data to be used for displaying the computed weight to the output control section 76.

If the search section 75 does not receive a request for an operation to search the meta-information/content database 74 for a content file from the request section 72, on the other hand, the search section 75 does not carry out a weighted search operation to search the meta-information/content database 74 for the content file.

The output control section 76 is a unit for controlling operations to output various kinds of data to the output section 18.

The output control section 76 displays a content and a weight on the output section 18 serving as a display unit on the basis of the content file and the data used for displaying the weight. As described above, the content file and the data are received from the search section 75.

On the basis of schedule data received from the PIM-data-recording section 77, the output control section 76 generates data to be used for displaying a schedule and, on the basis of the generated used for displaying a schedule, the output control section 76 also displays a schedule on the output section 18 serving as a display unit.

The PIM-data-recording section 77 is a unit used for recording address data, schedule data, and learning data. The PIM-data-recording section 77 is a predetermined area included in the recording section 19 as an area used for recording address data, schedule data, and learning data. As described before, the recording section 19 is typically a hard disk. The PIM-data-recording section 77 supplies the recorded learning data to the recognition section 71. On the other hand, the PIM-data-recording section 77 supplies the recorded schedule data to the output control section 76.

Receiving an input signal from the input section 17, the PIM-data-recording section 77 updates the PIM data recorded therein on the basis of the received input signal. To be more specific, let us assume for example that the PIM-data-recording section 77 receives an input signal from the input section 17 as a signal making a request to update schedule data. In this case, the PIM-data-recording section 77 updates the schedule data recorded therein on the basis of the received input signal.

The input control section 78 is a unit for generating a request for re-execution of an operation to search the meta-information/content database 74 for a content file associated with a content selected by the user and supplying the generated request for re-execution of the search operation to the search section 75. The user selects the content displayed on the output section 18 serving as a display unit by operating the input section 17. It is to be noted that the request for re-execution of an operation to search the meta-information/content database 74 for a content file associated with a content selected by the user includes information used for identifying the content file to be used for displaying the content.

Receiving a request for re-execution of an operation to search the meta-information/content database 74 for a content file from the input control section 78, the search section 75 refers to meta information stored in the meta-information/content database 74 to carry out a weighted search operation to search the meta-information/content database 74 for the content file on the basis of a search key and the score of the search key, which are included in meta information associated with the content file specified in the request. The search key used as the basis of the weighted search operation carried out by the search section 75 includes the name of a user, the name of a location, and a word. The name of a user is information included in the meta information as information related to people. The name of a location is information included in the meta information as information related to locations. The word is information included in the meta information as information related to spoken words. In the weighted search operation, the search section 75 uses the score of the search key as a weight. On the basis of the content file found in the weighted search operation, the goodness of fit between the content file and the search key, and the weight of the search key, the search section 75 computes the weight of the content file found in the weighted search operation and generates data to be used for displaying the computed weight. Then, the search section 75 acquires the content file found in the weighted search operation from the meta-information/content database 74 and supplies the acquired content file as well as the generated data used for displaying the computed weight to the output control section 76.

If the search section 75 does not receive a request for re-execution of an operation to search the meta-information/content database 74 for a content file from the input control section 78, on the other hand, the search section 75 does not carry out a weighted search operation to search the meta-information/content database 74 for the content file.

The output control section 76 displays a content and a weight on the output section 18 serving as a display unit on the basis of the content file and the data used for displaying the weight. As described above, the content file and the data are received from the search section 75. On the basis of schedule data received from the PIM-data-recording section 77, the output control section 76 displays a schedule on the output section 18 serving as a display unit. It is to be noted that the output section 18 is capable of displaying one content or a plurality of contents.

By referring to a flowchart shown in FIG. 3, the following description explains processing carried out by the information-processing apparatus to display a content.

As shown in the figure, the flowchart begins with a step S11 at which the environment-monitoring section 16 monitors the environment (or conditions) surrounding the user to detect the surroundings of the user. The detected surroundings of the user are used for generating sensing data representing the surroundings of the user. The environment-monitoring section 16 then supplies the generated sensing data to the recognition section 71.

For example, at the step S11, the environment-monitoring section 16 may use still-image data, which represents still images each serving as a frame of a moving image based on moving-image data representing a moving image photographed by the video camera 101 employed in the environment-monitoring section 16, as sensing data as it is. As an alternative, the still-image data is discretely reduced at a predetermined discretely reducing ratio to generate sensing data. In either case, sensing data is generated from still-image data and supplied to the recognition section 71. In addition, as another alternative, when the shutter button 105 employed in the input section 17 is pressed, for example, the input section 17 generates a signal indicating that the shutter button 105 employed in the location recognition section 107 has been pressed, and supplies the generated signal to the recognition section 71 as sensing data.

Then, at the next step S12, the recognition section 71 recognizes the conditions surrounding the user on the basis of the pieces of sensing data received from the environment-monitoring section 16 and the input section 17.

For example, at the step S12, the face recognition section 106 employed in the recognition section 71 carries out face recognition processing based on still-image data supplied by the environment-monitoring section 16 as sensing data and learning data supplied by the PIM-data-recording section 77. The learning data typically includes still-image data of the face of the user identified by a user ID, a graph based on nodes as a graph illustrating the face of the user, distances between adjacent nodes, and a characteristic quantity of still-image data at each of the nodes. The nodes are each an edge portion of the face. Examples of the nodes are the mouth, eyes, and nose of the face represented by the still-image data. The characteristic quantity can be for example a Gabor characteristic quantity obtained by Gabor wavelet transformation carried out on the static-image data.

The face recognition section 106 employed in the recognition section 71 extracts characteristic members such as the mouth, the eyes, and the nose from the still-image data received from the environment-monitoring section 16 as sensing data by adoption of typically a flexible characteristic collation method. Subsequently, the face recognition section 106 employed in the recognition section 71 generates a graph of the face by using the extracted members as nodes of the graph. Then, the face recognition section 106 employed in the recognition section 71 finds distances between adjacent nodes of the generated graph illustrating the face and a characteristic quantity of each of the nodes. Subsequently, the face recognition section 106 employed in the recognition section 71 compares the found distances between adjacent nodes of the generated graph illustrating the face with distances between adjacent nodes pertaining to a user. The face recognition section 106 employed in the recognition section 71 also compares the found characteristic quantity of each of the nodes with a characteristic quantity of each node also pertaining to the user. In this way, the face recognition section 106 employed in the recognition section 71 is capable of recognizing the user. The distances between adjacent nodes pertaining to a user and the characteristic quantity of each of nodes also pertaining to the user are included in the learning data received from the PIM-data-recording section 77. Finally, the face recognition section 106 employed in the recognition section 71 generates data representing the result of the face recognition processing.

In addition, at the step S12, for example, the location recognition section 107 employed in the recognition section 71 carries out image recognition processing based on still-image data supplied by the environment-monitoring section 16 as sensing data and learning data supplied by the PIM-data-recording section 77. The learning data typically includes still-image data and characteristic quantities. The still-image data is data used for displaying still images such as the home and office of the user. The characteristic quantities include information on the luminance and chrominance of pixels in a variety of areas of data representing still images divided into predetermined portions in the areas. The location recognition section 107 employed in the recognition section 71 typically finds the characteristic quantities of the still-image data received from the environment-monitoring section 16 as sensing data and compares the found characteristic quantities with the characteristic quantities of the still-image data included in the learning data in order to determine the present position of the image recognition processing. Then, the location recognition section 107 employed in the recognition section 71 generates data representing the result of the image recognition processing.

On the top of that, at the step S12, for example, the audio recognition section 108 employed in the recognition section 71 carries out audio recognition processing based on audio data supplied by the environment-monitoring section 16 as sensing data and learning data supplied by the PIM-data-recording section 77. The learning data typically includes word-dictionary information and syntactical-rule information. The word-dictionary information is information on the pronunciation of each word to be recognized. The syntactical-rule information is information on chains connecting words included in the word-dictionary information. To be more specific, the audio recognition section 108 employed in the recognition section 71 extracts a characteristic quantity such as an MFCC (Mel Frequency Cepstrum Coefficient) from audio data received from the environment-monitoring section 16 as sensing data and uses the extracted characteristic quantity to recognize a word spoken at any of locations surrounding the information-processing apparatus on the basis of a continuous distribution HMM (Hidden Markov Model) method or the like while referring to the learning data. Finally, the audio recognition section 108 employed in the recognition section 71 generates data representing the result of the audio recognition processing.

Then, at the next step S13, the meta-information generation section 109 employed in the recognition section 71 generates meta information on the basis of pieces of sensing data received from the environment-monitoring section 16 and the input section 17, data generated by the face recognition section 106 as data representing the result of the face recognition processing, data generated by the location recognition section 107 as data representing the result of the image recognition processing, and data generated by the audio recognition section 108 as data representing the result of the audio recognition processing. Then, the meta-information generation section 109 employed in the recognition section 71 supplies the generated meta information to the request section 72.

The meta information typically includes pieces of information shown in FIGS. 4 and 5.

FIG. 4 is an explanatory diagram showing information included in the meta information. The information shown in the figure includes "Person", "Leitmotif", "Location", and "Time" items each representing the type of information. The items each include information corresponding to the item. For example, the "Person" item includes information related to a user recognized in face recognition processing.

By the same token, the "Leitmotif" item includes information related a spoken word recognized in audio recognition processing and the "Location" item includes information related a location recognized in image recognition processing. In the same way, the "Time" item includes information showing a date and a time.

In addition, as shown in FIG. 5, the "Person", "Leitmotif", and "Location" items each include a "Prospect" item. The "Prospect" item includes information related to one of a plurality of candidates obtained as a result of the recognition processing. Let us assume for example that users A and B have been recognized in the face recognition processing. In this case, the first "Prospect" item included in the "Person" item includes information related to user A while the second "Prospect"item included in the "Person" item includes information related to user B.

As another example, let us assume that locations F and G have been recognized in the image recognition processing as the present position. In this case, the first "Prospect" item included in the "Location" item includes information related to location F while the second "Prospect" item included in the "Location" item includes information related to location G.

In addition, the "Prospect" item includes a "Score" item, which includes a score revealing the degree of certainty for the result of recognition processing.

The "Location" item includes a "Latitude" item, which includes information showing the latitude of the present position of the information-processing apparatus. By the same token, the "Location" item also includes a "Longitude" item, which includes information showing the longitude of the present position of the information-processing apparatus. The present position of the information-processing apparatus is a measurement result produced by the GPS receiver apparatus 103 employed in the environment-monitoring section 16.

FIG. 6 is a diagram showing an example of meta information. A "Person" item shown on the second line from the top line of the figure as an item included in the meta information includes "Prospect" and "Score" items shown on the third line from the top line of the figure. The "Prospect" item shown on the third line from the top line of the figure includes the number 75, which is the user ID of a first user recognized in the face recognition processing. On the other hand, the "Score" item also shown on the third line from the top line of the figure includes a fraction number of 0.4235989, which is the value of a score representing the degree of certainty of a face recognition processing result indicating that the user ID of the first user recognized in the face recognition processing is 75.

Thus, the fraction number of 0.4235989 included in the "Score" item shown on the third line from the top line of the figure means that the degree of certainty of a face recognition processing result, which indicates that the user ID of the first user recognized in the face recognition processing is 75, is 42.35989%.

By the same token, the "Person" item shown on the second line from the top line of the figure as an item included in the meta information includes "Prospect" and "Score" items shown on the fourth line from the top line of the figure. The "Prospect" item shown on the fourth line from the top line of the figure includes the number 03, which is the user ID of a second user recognized in the face recognition processing. On the other hand, the "Score" item also shown on the fourth line from the top line of the figure includes a fraction number of 0.6628738, which is the value of a score representing the degree of certainty of a face recognition processing result indicating that the user ID of the second user recognized in the face recognition processing is 03.

Thus, the fraction number of 0.6628738 included in the "Score" item shown on the fourth line from the top line of the figure means that the degree of certainty of a face recognition processing result, which indicates that the user ID of the second user recognized in the face recognition processing is 03, is 66.28738%.

A "Leitmotif" item shown on the sixth line from the top line of the figure as an item included in the meta information includes "Prospect" and "Score" items shown on the seventh line from the top line of the figure. The "Prospect" item shown on the seventh line from the top line of the figure includes the phrase "dragon radar" composed of words included in a voice recognized in the audio recognition processing. On the other hand, the "Score" item also shown on the seventh line from the top line of the figure includes a fraction number of 0.44827411, which is the value of a score representing the degree of certainty of an audio recognition processing result indicating that the words composing the phrase "dragon radar" are words included in a voice recognized in the audio recognition processing.

Thus, the fraction number of 0.44827411 included in the "Score" item shown on the seventh line from the top line of the figure means that the degree of certainty of an audio recognition processing result, which indicates that the words composing the phrase "dragon radar" are words included in a voice recognized in the audio recognition processing, is 44.827411%.

By the same token, the "Leitmotif" item shown on the sixth line from the top line of the figure as an item included in the meta information includes "Prospect" and "Score" items shown on the eighth line from the top line of the figure. The "Prospect" item shown on the eighth line from the top line of the figure includes the word Philadelphia included in a voice recognized in the audio recognition processing. On the other hand, the "Score" item also shown on the eighth line from the top line of the figure includes a fraction number of 0.9987236, which is the value of a score representing the degree of certainty of an audio recognition processing result indicating that the word Philadelphia is included in a voice recognized in the audio recognition processing.

Thus, the fraction number of 0.9987236 included in the "Score" item shown on the eighth line from the top line of the figure means that the degree of certainty of an audio recognition processing result, which indicates that the word Philadelphia is included in a voice recognized in the audio recognition processing, is 99.87236%.

A "Location" item shown on the tenth line from the top line of the figure as an item included in the meta information includes a "Latitude" item shown on the eleventh line from the top line of the figure. Data of 35 37 22 17 N included in the "Latitude" item shown on the eleventh line from the top line of the figure is the latitude of a position measured by the GPS receiver apparatus 103 employed in the environment-monitoring section 16 as the present position of the information-processing apparatus. To put it in more detail, the data of 35 37 22 17 N included in the "Latitude" item shown on the eleventh line from the top line of the figure indicates that the latitude of a position measured by the GPS receiver apparatus 103 employed in the environment-monitoring section 16 as the present position of the information-processing apparatus is a north latitude of 35 degrees, 37 minutes, and 22.17 seconds.

By the same token, the "Location" item shown on the tenth line from the top line of the figure as an item included in the meta information includes a "Longitude" item shown on the twelfth line from the top line of the figure. Data of 139 44 23 83 E included in the "Longitude" item shown on the twelfth line from the top line of the figure is the longitude of a position measured by the GPS receiver apparatus 103 employed in the environment-monitoring section 16 as the present position of the information-processing apparatus. To put it in more detail, the data of 139 44 23 83 E included in the "Longitude" item shown on the twelfth line from the top line of the figure indicates that the longitude of a position measured by the GPS receiver apparatus 103 employed in the environment-monitoring section 16 as the present position of the information-processing apparatus is an east longitude of 139 degrees, 44 minutes, and 23.83 seconds.

A "Location" item shown on the tenth line from the top line of the figure as an item included in the meta information also includes "Prospect" and "Score" items shown on the thirteenth line from the top line of the figure. The phrase "B9 conference room of the second building" included in the "Prospect" item shown on the thirteenth line from the top line of the figure is the name of a location recognized in the image recognition processing. On the other hand, the "Score" item also shown on the thirteenth line from the top line of the figure includes a fraction number of 0.2629673, which is the value of a score representing the degree of certainty of an image recognition processing result indicating that the phrase "B9 conference room of the second building" is the name of a location recognized in the image recognition processing.

Thus, the fraction number of 0.2629673 included in the "Score" item shown on the thirteenth line from the top line of the figure means that the degree of certainty of an image recognition processing result, which indicates that the phrase "B9 conference room of the second building" is the name of a location recognized in the image recognition processing, is 26.29673%.

By the same token, the "Location" item shown on the tenth line from the top line of the figure as an item included in the meta information also includes "Prospect" and "Score" items shown on the fourteenth line from the top line of the figure. The phrase "Gandhara conference room" included in the "Prospect" item shown on the fourteenth line from the top line of the figure is a name recognized in the image recognition processing as the name of a location. On the other hand, the "Score" item also shown on the fourteenth line from the top line of the figure includes a fraction number of 0.8659298, which is the value of a score representing the degree of certainty of an image recognition processing result indicating that the phrase "Gandhara conference room" is the name of a location recognized in the image recognition processing.

Thus, the fraction number of 0.8659298 included in the "Score" item shown on the fourteenth line from the top line of the figure means that the degree of certainty of an image recognition processing result, which indicates that the phrase "Gandhara conference room" is the name of a location recognized in the image recognition processing, is 86.59298%.

Data of 03-08-29-16:47 included in a "Time" item shown on the sixteenth line from the top line of the figure is data representing a date and a time. To be more specific, the data of 03-08-29-16:47 included in the "Time" item shown on the sixteenth line from the top line of the figure represents a time of 16:47 on Aug. 29, 2003.

Let us refer back to the flowchart shown in FIG. 3. At a step S14, the environment-monitoring section 16 generates content data and supplies the generated content data to the content generation section 73.

For example, at the step S14, the environment-monitoring section 16 uses still-image data, which represents still images each serving as a frame of a moving image based on moving-image data representing a moving image photographed by the video camera 101 employed in the environment-monitoring section 16, as content data as it is. As an alternative, the still-image data is compressed at a predetermined compression ratio to generate content data. In either case, content data is generated from still-image data and supplied to the content generation section 73. In addition, as another alternative, the environment-monitoring section 16 generates content data as moving-image data on the basis of moving-image data representing a moving image photographed by the video camera 101 employed in the environment-monitoring section 16.

Then, at the next step S15, the content data generated by the environment-monitoring section 16 is stored temporarily in the buffer 113 employed in the content generation section 73.

Subsequently, at the next step S16, the request section 72 carries out processing to generate a request for generation of a content file. It is to be noted that details of the processing to generate a request for generation of a content file will be described later. In the processing to generate a request for generation of a content file, the request section 72 generates the request for generation of a content file on the basis of meta information received from the recognition section 71 and supplies the generated request for generation of a content file to the content generation section 73.

Then, at the next step S17, the content generation section 73 carries out processing to generate a content file. It is to be noted that details of the processing to generate a content file will be described later. In the processing to generate a content file, the content generation section 73 generates the content file on the basis of a content-file generation request received from the request section 72.

Subsequently, at the next step S18, the request section 72 carries out processing to generate a request for an operation to search the meta-information/content database 74 for a content file. It is to be noted that details of the processing to generate a request for an operation to search the meta-information/content database 74 for a content file will be described later. In the processing to generate a request for an operation to search the meta-information/content database 74 for a content file, the request section 72 generates the search request on the basis of meta information received from the recognition section 71 and supplies the generated search request to the search section 75.

Then, at the next step S19, the search section 75 carries out processing to search the meta-information/content database 74 for a content file. Subsequently, the flow of the processing goes back to the step S11 to repeat the processing described above. It is to be noted that details of the processing to search the meta-information/content database 74 for a content file will be described later. In the processing to search the meta-information/content database 74 for a content file, the search section 75 searches the meta-information/content database 74 for a content file on the basis of a content-file search request received from the request section 72. Then, the search section 75 displays a content for the content file found in the search processing on the output section 18 serving as a display unit.

As described above, the information-processing apparatus generates meta information and a content file on the basis of the generated meta information. Also on the basis of the generated meta information, the information-processing apparatus searches the meta-information/content database 74 for a content file and displays a content for the content file found in the search processing on the output section 18 serving as a display unit.

As described above, even if the user does not issue a command, the information-processing apparatus generates a content file provided that conditions surrounding the user have changed. It is thus possible to avoid a situation in which a content file cannot be generated due to the fact that the user does not issue a command only because for example the user is busy doing something else. In addition, it is also possible to avoid a situation in which the user is not capable of enjoying the location because the user is busy issuing a command making a request for generation of a content file.

In addition, even if the user does not issue a command, the information-processing apparatus searches the meta-information/content database 74 for an associative content file from conditions surrounding the user provided that the conditions surrounding the user have changed, and displays or presents a content for the content file found in the search operation. Thus, since a content representing past conditions surrounding the user as conditions already forgotten by the user can be displayed, the information-processing apparatus helps the user recollect the memory of the user.

Figure 7:
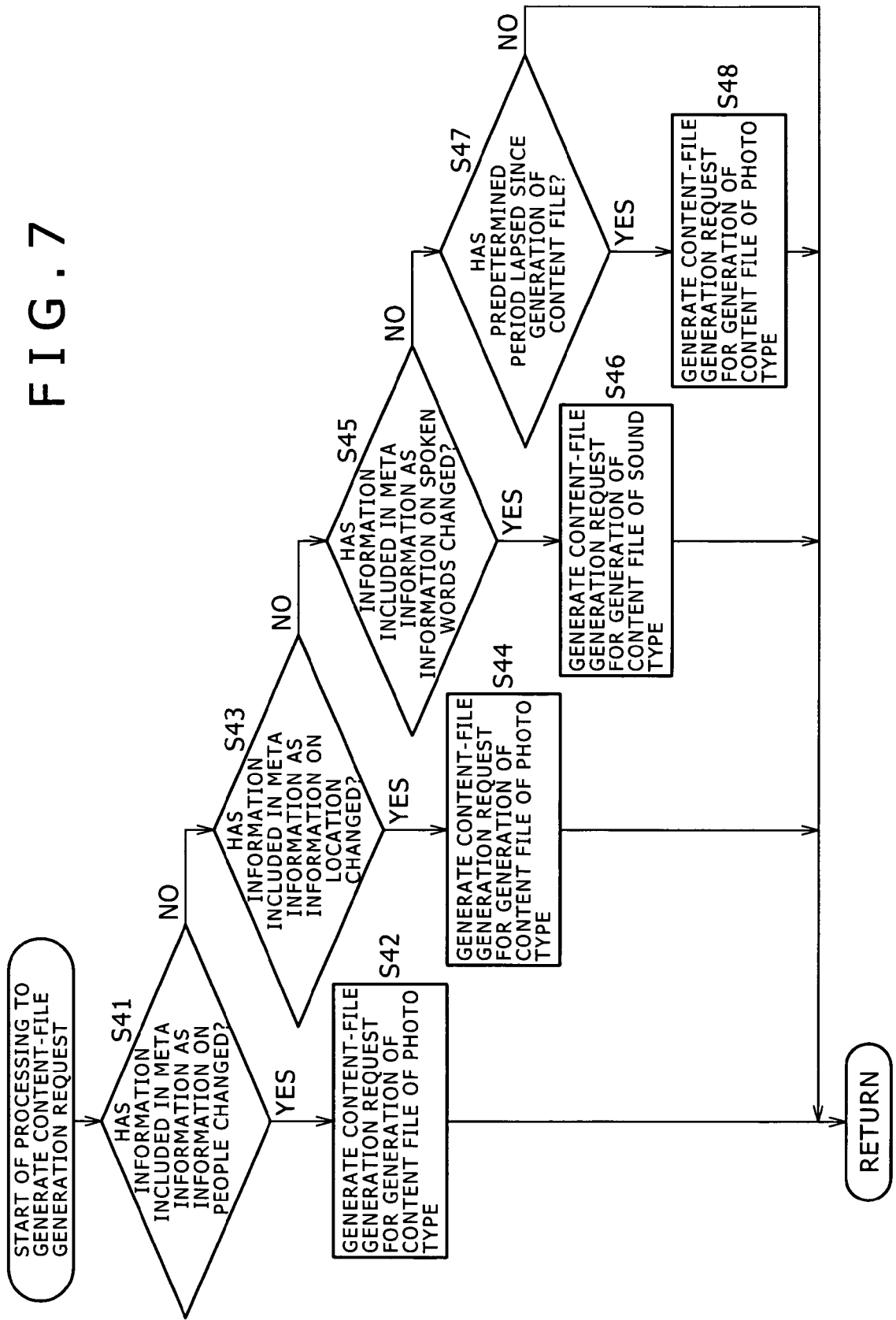
FIG. 7 shows a flowchart representing processing carried out to generate a request for generation of a content file.

By referring to a flowchart shown in FIG. 7, the following description explains the processing carried out at the step S16 of the flowchart shown in FIG. 3 to generate a request for generation of a content file.

The flowchart shown in FIG. 7 begins with a step S41 at which the request section 72 produces a result of determination as to whether or not information included in meta information as information related to people has changed. As described earlier, the meta information is received from the recognition section 71. For example, the request section 72 produces a result of determination as to whether or not information included in a "Person" item of the meta information shown in FIG. 6 has changed by comparison of the meta information received from the recognition section 71 with the immediately preceding meta information also received from the recognition section 71. Let us assume for example that the score of user A, which is added information related to the user A to the "Person" item of the meta information, exceeds a typical predetermined value to result in a change in information. In this case, the request section 72 produces a determination result indicating that information included in meta information as information related to people has changed.

If the determination result produced in the process carried out at the step S41 indicates that the information included in meta information as information related to people has changed, the flow of the processing goes on to a step S42. This is because the result of the determination reveals recognition of the fact that a new user exists in the environment surrounding the information-processing apparatus. At the step S42, the generation-requesting section 110 employed in the request section 72 generates a content-file generation request as a request for generation of a content file pertaining to a category of the "photo" type. The request section 72 then supplies the request for generation of a content file to the content generation section 73 and the execution of the processing represented by this flowchart is terminated. In this case, the generation-requesting section 110 employed in the request section 72 typically generates a content-file generation request including information indicating a time included in the "Time" term of the meta information shown in FIG. 6. By doing so, in the processing to generate a content file, content data at exactly a time of a change in meta information can be recorded as a content file without being affected by the time it takes to carry out the processing.

If the determination result produced in the process carried out at the step S41 indicates that the information included in meta information as information related to people has not changed, on the other hand, the flow of the processing goes on to a step S43. This is because a new user has not been recognized in the environment surrounding the information-processing apparatus. At the step S43, the request section 72 produces a result of determination as to whether or not information included in the meta information received from the recognition section 71 as the information related to a location has changed. For example, the request section 72 produces a result of determination as to whether or not information included in a "Location" item of the meta information shown in FIG. 6 has changed by comparison of the meta information received from the recognition section 71 with the immediately preceding meta information also received from the recognition section 71. Let us assume for example that the score of location B, which is added information related to the user B to the "Location" item of the meta information, exceeds a typical predetermined value to result in a change in information. In this case, the request section 72 produces a determination result indicating that information included in meta information as information related to a location has changed.

If the determination result produced in the process carried out at the step S43 indicates that the information included in meta information as information related to a location has changed, the flow of the processing goes on to a step S44. This is because the result of the determination reveals recognition of the fact that the position of the information-processing apparatus has changed or the fact that the information-processing apparatus has been moved. At the step S44, the generation-requesting section 110 employed in the request section 72 generates a content-file generation request as a request for generation of a content file pertaining to a category of the "photo" type. The request section 72 then supplies the request for generation of a content file to the content generation section 73 and the execution of the processing represented by this flowchart is terminated. In this case, the generation-requesting section 110 employed in the request section 72 typically generates a content-file generation request including information indicating a time included in the "Time" term of the meta information shown in FIG. 6.

If the determination result produced in the process carried out at the step S43 indicates that the information included in meta information as information related to a location has not changed, on the other hand, the flow of the processing goes on to a step S45. This is because the result of the determination does not reveal recognition of the fact that the position of the information-processing apparatus has changed or the fact that the information-processing apparatus has been moved. At the step S45, the request section 72 produces a result of determination as to whether or not information included in the meta information received from the recognition section 71 as the information related to a spoken word has changed. For example, the request section 72 produces a result of determination as to whether or not information included in a "Leitmotif" item of the meta information shown in FIG. 6 has changed by comparison of the meta information received from the recognition section 71 with the immediately preceding meta information also received from the recognition section 71. Let us assume for example that the score of word C, which is added information related to the user C to the "Leitmotif" item of the meta information, exceeds a typical predetermined value to result in a change in information. In this case, the request section 72 produces a determination result indicating that information included in meta information as information related to a spoken word has changed.

If the determination result produced in the process carried out at the step S45 indicates that the information included in meta information as information related to a spoken word has changed, the flow of the processing goes on to a step S46. This is because the result of the determination reveals recognition of the fact that a voice has been generated at a location close to the information-processing apparatus. At the step S46, the generation-requesting section 110 employed in the request section 72 generates a content-file generation request as a request for generation of a content file pertaining to a category of the "audio" type. The request section 72 then supplies the request for generation of a content file to the content generation section 73 and the execution of the processing represented by this flowchart is terminated. In this case, the generation-requesting section 110 employed in the request section 72 typically generates a content-file generation request including information indicating a time included in the "Time" term of the meta information shown in FIG. 6.

If the determination result produced in the process carried out at the step S45 indicates that the information included in meta information as information related to a spoken word has not changed, on the other hand, the flow of the processing goes on to a step S47. This is because the result of the determination does not reveal recognition of the fact that a voice has been generated at a location close to the information-processing apparatus. At the step S47, the request section 72 produces a result of determination as to whether or not a predetermined period of time has lapsed since the generation of the content file.

If the determination result produced in the process carried out at the step S47 indicates that a predetermined period of time has lapsed since the generation of the content file, the flow of the processing goes on to a step S48. At the step S48, the generation-requesting section 110 employed in the request section 72 generates a content-file generation request as a request for generation of a content file pertaining to a category of the "photo" type. The request section 72 then supplies the request for generation of a content file to the content generation section 73 and the execution of the processing represented by this flowchart is terminated. In this case, the generation-requesting section 110 employed in the request section 72 typically generates a content-file generation request including information indicating a time included in the "Time" term of the meta information shown in FIG. 6.

If the determination result produced in the process carried out at the step S47 indicates that a predetermined period of time has not lapsed since the generation of the content file, on the other hand, the process of the step S48 is skipped and the execution of the processing represented by this flowchart is terminated.

As described above, on the basis of meta information received from the recognition section 71, the request section 72 produces a result of determination as to whether or not the environment surrounding the user has changed. If the result of the determination indicates that the environment surrounding the user has changed, the request section 72 generates a content-file generation request as a request for generation of a content file. If the result of the determination does not indicate that the environment surrounding the user has changed, on the other hand, the request section 72 does not generate a request for generation of a content file.

As described above, the information-processing apparatus monitors the environment surrounding the user and generates a content-file generation request as a request for generation of a content file in accordance with a change in environment surrounding the user. Thus, the user does not need to issue a command for generating a content file to the information-processing apparatus.

Figure 8:
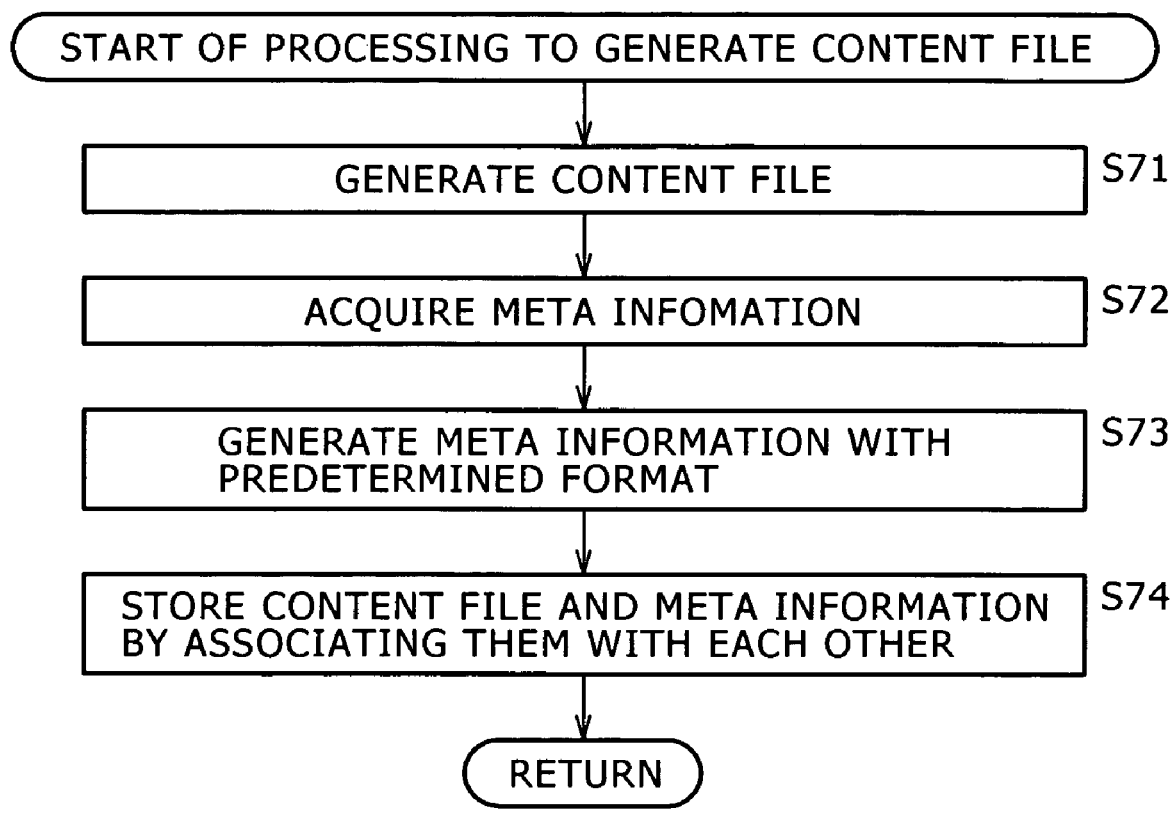
FIG. 8 shows a flowchart representing processing carried out to generate a content file.

Next, by referring to a flowchart shown in FIG. 8, the following description explains processing corresponding to the process carried out at the step S17 of the flowchart shown in FIG. 3.

The flowchart shown in FIG. 8 begins with a step S71 at which the content generation section 73 generates a content file on the basis of a content-file generation request received from the request section 72 and content data stored temporarily in the buffer 113 employed in the content generation section 73. As a matter of fact, the process carried out at this step is triggered by the reception of the request for generation of a content file from the request section 72.

To put it in detail, the content data used by the content generation section 73 as a basis for the generation of a content file at the step S71 is content data generated by the environment-monitoring section 16 at a time specified in the content-file generation request received from the request section 72, supplied by the environment-monitoring section 16 to the content generation section 73, and temporarily stored in the buffer 113 employed in the content generation section 73. The content generation section 73 generates a content file pertaining to a category of the type specified in the content-file generation request received from the request section 72.

Let us assume for example that information included in the content-file generation request received from the request section 72 as information on a time is t1 and the type specified in the content-file generation request received from the request section 72 as a type of a content file to be generated is the "photo" type. In this case, the content generation section 73 generates a content file pertaining to a category of the "photo" type on the basis of content data generated by the environment-monitoring section 16 at the time t1, supplied by the environment-monitoring section 16 to the content generation section 73 as static-image data, and temporarily stored in the buffer 113 employed in the content generation section 73.

It is to be noted that the above description explains only a case in which a request for generation of a content file is received from the request section 72. If a request for generation of a content file is not received from the request section 72, on the other hand, the content generation section 73 does not generate a content file and the execution of the processing represented by this flowchart is merely terminated.

Then, at the next step S72, the content generation section 73 acquires meta information generated at a time specified in the content-file generation request received from the request section 72 from the recognition section 71. Let us assume for example that the time specified in the content-file generation request received from the request section 72 is t1. In this case, at the step S72, the content generation section 73 acquires meta information generated at the time t1 from the recognition section 71.

Subsequently, at the next step S73, the content generation section 73 refers to schedule data stored in the PIM-data-recording section 77 to generate meta information having a predetermined format on the basis of the meta information acquired from the recognition section 71 and, at the next step S74, the content generation section 73 supplies the generated meta information and the generated content file to the meta-information/content database 74 for storing the meta information and the content file by associating them with each other as will be described later.

For example, at the step S73, the content generation section 73 refers to schedule data stored in the PIM-data-recording section 77 to generate meta information having an XML (Extensible Markup Language) format on the basis of the meta information acquired from the recognition section 71 and, at the next step S74, the content generation section 73 supplies the generated meta information and the generated content file to the meta-information/content database 74.

In this case, the content generation section 73 generates meta information pertaining to a category of the XML format further including items shown in FIG. 9 in the meta information acquired from the recognition section 71.

A "Factor" item is information showing information included in a file. Thus, the "Factor" item indicates a file in which the meta information is stored. A "Guide" item includes a number used for identifying a content file.

A "Filepath" item includes information indicating a path serving as an address at which the content file is recorded. A "Type" item includes information indicating the type of the content file. An "event" item is information included in schedule data.

FIG. 10 is a diagram showing typical meta information generated by the content generation section 73.

The meta information shown in FIG. 10 is meta information obtained by newly adding the "Factor", "Guide", "Filepath", "Type" and "event" items to the meta information shown in FIG. 6. It is to be noted that, since the "Person", "Leitmotif", "Location", and "Time" items shown in FIG. 10 are the same as those shown in FIG. 6, their explanations are not repeated to avoid a duplication.

A "Factor" item shown on the second line from the top line of the figure covers a range starting with an item on the third item from the top line of the figure and ending with an item on the twenty-second item from the top line of the figure. The range represents the meta information itself.

"3090B941-751B-403f-A224-4C4966166983" included in the "Guide" item shown on the third line from the top line of the figure is a number used for identifying a content file corresponding to the meta information. "d:¥EQ-Data¥photo002.jpg" provided on the fifth line from the top line of the figure as information included in the "Filepath" item shown on the fourth line from the top line of the figure is a path representing an address at which the content file corresponding to the meta information is recorded. This typical path indicates that the name of the content file is "photo002.jpg", the content file is placed in a folder having a name of "EQ-Data", and the folder is included in a drive with a name of "d". "Photo" shown on the sixth line from the top line of the figure indicates that the type of the content file corresponding to the meta information is the photo type.

As described above, the content generation section 73 generates meta information including a number in the "Guide" item as information used for identifying a content file, a path in the "Filepath" item as an address of the content file, and a type in the "Type" item as information indicating the type of the content file. In this way, the generated meta information can be associated with the content file.

In addition, "August conference of first department of second division @ Gandhara conference room" included in the "event" item on the twenty-first line from the top line of the figure is a schedule item included in schedule data recorded in the PIM-data-recording section 77. "03-08-29-16:47" on the twenty-second line from the top line of the figure is a schedule time of the schedule set for the user. These pieces of information indicate that the user is supposed to attend an August conference to be held by the First Department of the Second Division at 16:47 on Aug. 29, 2003 at the Gandhara conference room.

Let us return to the flowchart shown in FIG. 8. At a step S74, the meta-information/content database 74 is used for storing the generated meta information and the generated content file, which are received from the content generation section 73, by associating the meta information and the content file with each other. Finally, the execution of the processing represented by this flowchart is terminated.

As described above, the content generation section 73 generates a content file and meta information. Then, the meta-information/content database 74 is used for storing the generated meta information and the generated content file by associating them with each other. Since meta information is generated for a content file and they are stored by associating them with each other, the content file can be searched for with ease.

Figure 11:
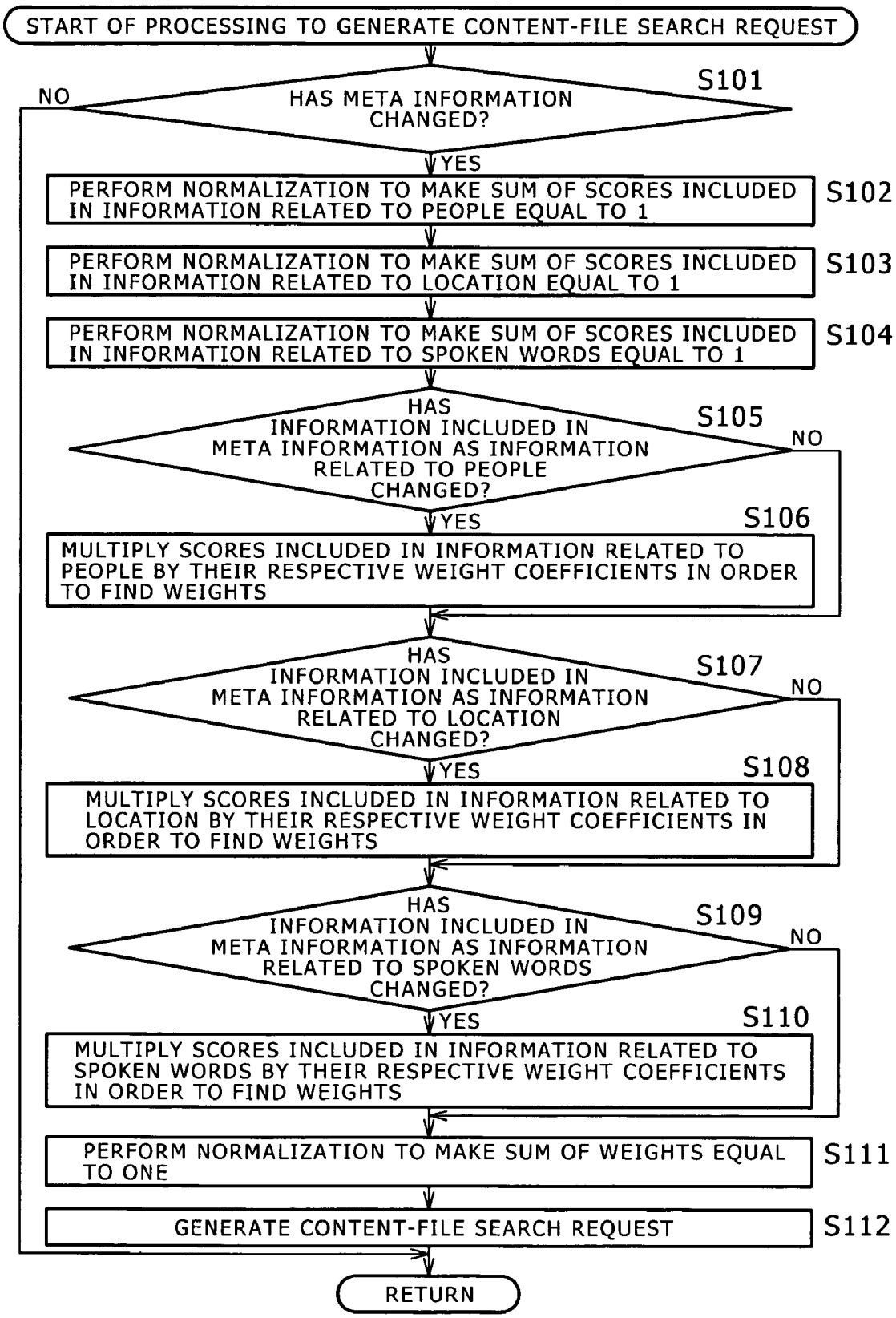
FIG. 11 shows a flowchart representing processing carried out to generate a request for an operation to search a meta-information/content database for a content file.

Next, by referring to a flowchart shown in FIG. 11, the following description explains processing to generate a request for an operation to search the meta-information/content database 74 for a content file as processing corresponding to the process carried out at the step S18 of the flowchart shown in FIG. 3.

The flowchart shown in FIG. 11 begins with a step S101 at which the request section 72 produces a result of determination as to whether or not information included in meta information received from the recognition section 71 has changed. As a matter of fact, the process carried out at this step is triggered by the reception of the meta information from the recognition section 71.

Typically, at the step S101, the request section 72 produces a result of determination as to whether or not information included in meta information received from the recognition section 71 has changed by comparison of the meta information received from the recognition section 71 with immediately preceding meta information also received from the recognition section 71.

If the determination result produced in the process carried out at the step S101 indicates that the information included in meta information received from the recognition section 71 has changed, the flow of the processing goes on to a step S102 at which the weight computation section 112 employed in the request section 72 normalizes scores of information included in the meta information as information related to people in order to make the sum of the scores equal to 1.

Let us assume for example that, in the normalization process carried out at the step S102, the meta information includes information related to user A and information related to user B as pieces of information related to people. In this case, the weight computation section 112 employed in the request section 72 normalizes the scores of users A and B in order to make the sum of the scores equal to 1. Let us assume for example that the score of user A is 0.4 and the score of user B is 0.1. In this case, the weight computation section 112 employed in the request section 72 normalizes the score of user A to 0.8 and the score of user B to 0.2.

Then, at the next step S103, the weight computation section 112 employed in the request section 72 normalizes scores of information included in the meta information as information related to locations in order to make the sum of the scores equal to 1.

Let us assume for example that, in the normalization process carried out at the step S103, the meta information includes information related to location D and information related to location E as pieces of information related to locations. In this case, the weight computation section 112 employed in the request section 72 normalizes the scores of locations D and E in order to make the sum of the scores equal to 1. Let us assume for example that the score of location D is 0.4 and the score of location E is 0.1. In this case, the weight computation section 112 employed in the request section 72 normalizes the score of location D to 0.8 and the score of location E to 0.2.

Then, at the next step S104 the weight computation section 112 employed in the request section 72 normalizes scores of information included in the meta information as information related to spoken words in order to make the sum of the scores equal to 1.

Let us assume for example that, in the normalization process carried out at the step S104, the meta information includes information related to word K and information related to word J as pieces of information related to spoken words. In this case, the weight computation section 112 employed in the request section 72 normalizes scores of words K and J in order to make the sum of the cores equal to 1. Let us assume for example that the score of word J is 0.4 and the score of word K is 0.1. In this case, the weight computation section 112 employed in the request section 72 normalizes the score of word J to 0.8 and the score of word K to 0.2.

Then, at the next step S105, the request section 72 produces a result of determination as to whether or not information included in meta information as the information related to people has changed. Typically, the request section 72 produces a result of determination as to whether or not information included in the "Person" item of meta information shown in FIG. 6 changed by comparison of the meta information received from the recognition section 71 with immediately preceding meta information also received from the recognition section 71. Let us assume for example that information related to user A is added to the "Person" item of the meta information and the score of user A exceeds a typical predetermined value to result in a change in information. In this case, the request section 72 produces a determination result indicating that information included in meta information as the information related to people has changed.

If the determination result produced in the process carried out at the step S105 indicates that information included in meta information as the information related to people has changed, the flow of the processing goes on to a step S106 at which the weight computation section 112 employed in the request section 72 multiplies the scores included in the information related to people by their respective weight coefficients in order to find weights of the people.

The weight coefficients are each a value determined in advance as a value, which indicates the relative priority level of a search key as relative to the priority level of another search key in a process to produce a result of determination as to whether or not information included in meta information as the information related to people has changed. If it is desired to set user B at a priority level higher than that of user A, for example, the weight coefficient of user A is set at 1 while the weight coefficient of user B is set at 2.

Thus, if information included in meta information as the information related to people includes information related to user A and information related to user B, for example, at the step S106, the weight computation section 112 employed in the request section 72 multiplies the score of user A by the predetermined weight coefficient of user A in order to find the weight of user A and the score of user B by the predetermined weight coefficient of user B in order to find the weight of user B.

In addition, a weight coefficient can be modified in accordance with the magnitude of a change in information included in the meta information. Let us assume for example that information included in meta information A received from the recognition section 71 as the information related to people includes information related to user A and information related to user B. Also let us assume for example that information included in meta information B immediately before meta information A from the recognition section 71 as the information related to people includes information related to user A only. In this case, since meta information A includes information related to user A and information related to user B while meta information B includes only information related to user A, the magnitude of a change in information for user B is greater than that for user A. Thus, for example, the weight coefficient of user A can be set at 1 while the weight coefficient of user B can be set at 2.

In addition, let us assume for example that information included in meta information as the information related to a location has changed from Shinjuku to Shibuya. In this case, the weight coefficient of Shibuya can be set at a large value. As an alternative, all weight coefficients can be set at 1.

If the determination result produced in the process carried out at the step S105 indicates that information included in meta information as the information related to people has not changed, on the other hand, the flow of the processing goes on to a step S107, skipping the process supposed to be carried out at the step S106.

At the step S107, the request section 72 produces a result of determination as to whether or not information included in the meta information as information related to a location has changed. Typically, the request section 72 produces a result of determination as to whether or not information included in the "Location" item of meta information shown in FIG. 6 changed by comparison of the meta information received from the recognition section 71 with immediately preceding meta information also received from the recognition section 71. Let us assume for example that information related to location D is added to the "Location" item of the meta information and the score of location D exceeds a typical predetermined value to result in a change in information. In this case, the request section 72 produces a determination result indicating that information included in meta information as the information related to a location has changed.

If the determination result produced in the process carried out at the step S107 indicates that information included in meta information as the information related to a location has changed, the flow of the processing goes on to a step S108 at which the weight computation section 112 employed in the request section 72 multiplies the scores included in the information related to locations by their respective weight coefficients in order to find weights of the locations.

Thus, if information included in meta information as the information related to locations includes information related to location D and information related to location F, for example, at the step S108, the weight computation section 112 employed in the request section 72 multiplies the score of location D by the predetermined weight coefficient of location D in order to find the weight of location D and the score of location F by the predetermined weight coefficient of location F in order to find the weight of location F. It is to be noted that, as described earlier, a weight coefficient can be modified in accordance with the magnitude of a change in information included in the meta information.

If the determination result produced in the process carried out at the step S107 indicates that information included in meta information as the information related to a location has not changed, on the other hand, the flow of the processing goes on to a step S109, skipping the process supposed to be carried out at the step S108.

At the step S109, the request section 72 produces a result of determination as to whether or not information included in the meta information as information related to a spoken word has changed. Typically, the request section 72 produces a result of determination as to whether or not information included in the "Leitmotif" item of meta information shown in FIG. 6 changed by comparison of the meta information received from the recognition section 71 with immediately preceding meta information also received from the recognition section 71. Let us assume for example that information related to word J is added to the "Leitmotif" item of the meta information and the score of word J exceeds a typical predetermined value to result in a change in information. In this case, the request section 72 produces a determination result indicating that information included in meta information as the information related to a location has changed.

If the determination result produced in the process carried out at the step S109 indicates that information included in meta information as the information related to a spoken word has changed, the flow of the processing goes on to a step Silo at which the weight computation section 112 employed in the request section 72 multiplies the scores included in the information related to spoken words by their respective weight coefficients in order to find weights of the words.

Thus, if information included in meta information as the information related to spoken words includes information related to word J and information related to word K, for example, at the step S110, the weight computation section 112 employed in the request section 72 multiplies the score of word J by the predetermined weight coefficient of word J in order to find the weight of word J and the score of word K by the predetermined weight coefficient of word K in order to find the weight of word K. It is to be noted that, as described before, a weight coefficient can be modified in accordance with the magnitude of a change in information included in the meta information.

If the determination result produced in the process carried out at the step S109 indicates that information included in meta information as the information related to a spoken word has not changed, on the other hand, the flow of the processing goes on to a step S111, skipping the process supposed to be carried out at the step S110.

At the step S111, the weight computation section 112 employed in the request section 72 normalizes the weights in order to make the sum of the weights equal to 1. Let assume for example that the weight of user A, the weight of user B, the weight of location D, the weight of location F, the weight of spoken word J, and the weight of spoken word K are computed. In this case, the weight computation section 112 employed in the request section 72 normalizes the weight of user A, the weight of user B, the weight of location D, the weight of location F, the weight of spoken word J, and the weight of spoken word K in order to make the sum of the weights equal to 1.

Then, at the next step S112, the search-requesting section 111 employed-in the request section 72 generates a content-file search request including the search keys and weights computed by the weight computation section 112 employed in the request section 72 as the weights of the search keys. The request section 72 then supplies the generated request for an operation to search the meta-information/content database 74 for a content file to the search section 75 and the execution of the processing represented by this flowchart is terminated. At the step S112, the search-requesting section 111 employed in the request section 72 generates a content-file search request specifying search keys including the name of a user included in the information related to people, the name of a location included in the information related to locations, and a word included in the information related to spoken words.

Figures 12, 13:
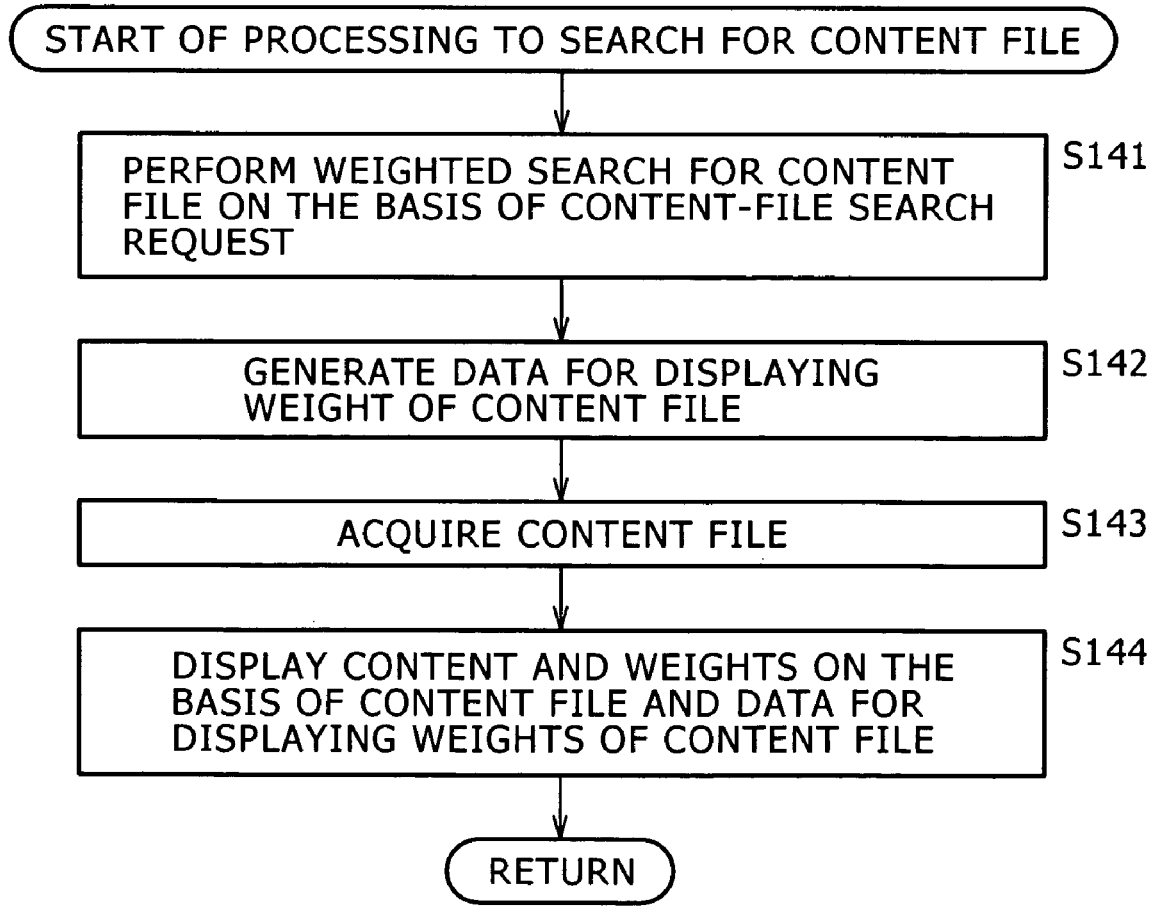
FIG. 12 is an explanatory diagram showing a request for an operation to search the meta-information/content database for a content file.
FIG. 13 shows a flowchart representing processing to search the meta-information/content database for a content file.

For example, at the step S112, the search-requesting section 111 employed in the request section 72 generates a content-file search request including search keys shown in FIG. 12 and weights of the search keys. The request section 72 then supplies the generated request for an operation to search the meta-information/content database 74 for a content file to the search section 75.

FIG. 12 is an explanatory diagram showing a typical request for an operation to search the meta-information/content database 74 for a content file.

As search keys, the typical content-file search request shown in FIG. 12 includes "user A", "user B", "home", and "night". In addition, the weights of the "user A", "user B", "home", and "night" search keys are normalized. As a result, the weights of the "user A", "user B", "home", and "night" search keys are normalized to 0.4, 0.2, 0.2, and 0.2 respectively.

In addition, if the determination result produced in the process carried out at the step S101 indicates that the information included in meta information received from the recognition section 71 has not changed, on the other hand, the execution of the processing represented by this flowchart is ended without carrying out the processes of the steps S102 to S112. This is because a request for an operation to search the meta-information/content database 74 for a content file does not need to be generated.

In this way, the request section 72 thus generates a request for an operation to search the meta-information/content database 74 for a content file.

By generating a content-file search request including search keys and weights of the search keys as explained above, it is possible to carry out a weighted search operation based on search keys later.

Next, by referring to a flowchart shown in FIG. 13, the following description explains processing to search the meta-information/content database 74 for a content file as processing corresponding to the process carried out at the step S19 of the flowchart shown in FIG. 3.

The flowchart shown in FIG. 13 begins with a step S141 at which the search section 75 carries out a weighted search operation to search the meta-information/content database 74 for a content file by referring to meta information stored in the meta-information/content database 74 on the basis of a content-file search request received from the request section 72. As a matter of fact, the process carried out at this step is triggered by the reception of the request for an operation to search the meta-information/content database 74 for a content file from the request section 72.

For example, at the step S141, the search section 75 carries out a weighted search operation to search the meta-information/content database 74 for a content file through assignment of priority levels on the basis of the degree of adaptation between information included in meta information stored in the meta-information/content database 74 and search keys included in a content-file search request received from the request section 72.

Thus, in a weighted search operation carried out to search the meta-information/content database 74 for a content file on the basis of the typical content-file search request shown in FIG. 12, for example, the weight of a search key is multiplied by a value of 1 if the search key is included in meta information stored in the meta-information/content database 74 but the weight of a search key is multiplied by a value of 0 if the search key is not included in the meta information. The operation to multiply the weight of a search key by the value of 1 or 0 is carried out on all search keys included in the request for an operation to search the meta-information/content database 74 for a content file. Then, the sum of products each obtained as a result of multiplication of the weight of a search key by the value of 1 or 0 is used as the weight of a content file associated with the meta information.

For example, the weight of a content file associated with meta information including information related to "user A" and information related to "home" but including neither information related to "user B" nor information related to "night" is found to be 0.6, which is the value of ((0.4×1)+ (0.2×0)+(0.2×1)+(0.2×0)). In this case, the larger the value of the weight of the content file, the higher the degree of adaptation of the search keys and, hence, the higher the priority level of the content file.

In accordance with the above description, the weight of a search key is multiplied by a value of 1 if the search key is included in meta information stored in the meta-information/ content database 74. It is to be noted, however, that the weight of a search key can also be multiplied by the score of the search key if the search key is included in meta information.

It is also worth noting that, if a request for an operation to search the meta-information/content database 74 for a content file is not received from the request section 72, on the other hand, the search section 75 does not carry out the search operation. Instead, the search section 75 merely terminates the execution of the processing represented by this flowchart.

Then, at the step S142, the search section 75 generates data to be used for displaying the weight of the content file found in the weighted search operation.

Subsequently, at the next step S143, the search section 75 acquires a content file from the meta-information/content database 74 on the basis of the result of the weighted search operation, and supplies the acquired content file as well as the data to be used for displaying the weight of the content file to the output control section 76. For example, at the step S143, the search section 75 acquires content files, which start with a content file pertaining to a category of the highest priority level and end with a content file having a predetermined priority level, from the meta-information/content database 74 on the basis of the result of the weighted search operation, and supplies the acquired content files as well as the data to be used for displaying the weight of the content file to the output control section 76.

Then, at the next step S144, the output control section 76 displays the contents and the weights of the content files on the basis of the content files and the data used for displaying the weights of the content files on the output section 18 serving as a display unit. As described above, the content files and the data used for displaying the weights of the content files are received from the search section 75. Finally, the execution of the processing represented by this flowchart is terminated.

It is to be noted that, in an operation to display contents on the output section 18 serving as a display unit, a content corresponding to a content file with a large weight may be displayed in the middle of the screen or displayed at a large size.

In addition, when the search section 75 receives a request for re-execution of an operation to search the meta-information/content database 74 for a content file from the input control section 78, the search section 75 searches the meta-information/content database 74 for meta information associated with a content file specified in the request. Then, the search section 75 uses information included in the meta information associated with the content file as search keys. Finally, the search section 75 carries out a weighted search operation to search the meta-information/content database 74 for the content file on the basis of the search keys and the score of each of the search keys. It is to be noted that, since the processing carried out by the search section 75 to re-execute the search operation is the same as the processing carried out to search the meta-information/content database 74 for a content file in accordance with the flowchart explained earlier by referring to FIG. 13, the description of the processing is not repeated to avoid a duplication.

As described above, the search section 75 searches the meta-information/content database 74 for a content file in accordance with a content-file search request received from the request section 72. Then, the output control section 76 displays a content based on the content file found in the search operation on the output section 18 serving as a display unit.

In this way, the information-processing apparatus carries out a weighted search operation to search the meta-information/content database 74 for a content file associated with conditions surrounding the user and displays a content based on the associative content file on the output section 18 serving as a display unit to make it possible to help the user recollect the memory of the user.

As described above, the information-processing apparatus searches the meta-information/content database 74 for a content file in accordance with conditions surrounding the user so as to allow a content according to the conditions surrounding the user to be displayed.

In accordance with the present invention, a content is displayed to be viewed by the user. Also in accordance with the present invention, conditions surrounding the user are monitored to generate meta information for the conditions. Thus, it is possible to search the meta-information/content database 74 for a content file according to the conditions surrounding the user.

Each series of processes described previously can be carried out by hardware or by execution of software. If each of the series of processes described above is carried out by execution of software, programs composing the software can be installed into a computer embedded in dedicated hardware, a general-purpose personal computer or the like from typically a program-recording medium. By installing a variety of programs into the general-purpose personal computer, the personal computer is capable of carrying out a variety of functions.

The aforementioned program-recording medium for recording the programs to be installed into a computer or a general-purpose personal computer is a package medium distributed and provided to the user separately from the computer or the general-purpose personal computer itself. As explained earlier by referring to FIG. 1, examples of the package medium include the magnetic disk 41 such as a flexible disk, the optical disk 42 such as a CD-ROM (Compact Disk-Read Only Memory) or a DVD (Digital Versatile Disk), the magneto-optical disk 43 such as an MD (Mini Disk, a trademark), and the semiconductor memory 44. As an alternative, the programs can also be presented to the user by storing the programs beforehand in recording mediums embedded in advance in the computer or the general-purpose personal computer. The recording mediums embedded in advance in the computer or the general-purpose personal computer are the ROM 12 and a hard disk included in the recording section 19 as shown in FIG. 1.

It is to be noted that, if necessary, each of the programs to be executed by the computer or the general-purpose personal computer to carry out a series of processes can also be installed into the computer or the general-purpose personal computer by downloading the programs from a source of programs by a radio or wire communication medium such as a local area network, the Internet, or digital satellite broadcasting through an interface including a router or a modem.

In addition, in this specification, steps of every program stored in a recording medium are carried out in a pre-prescribed order along the time axis. However, the steps do not have to be carried out in a pre-prescribed order along the time axis. For example, the steps of every program stored in a recording medium can also be carried out concurrently or individually.

While preferred embodiments of the invention have been described using specific terms, such description is for illustrative purposes only, and it is to be understood that changes and variations may be made without departing from the spirit or scope of the following claims.

What is claimed is:

1. An information-processing apparatus, comprising:
   means for detecting current conditions surrounding the information-processing apparatus and for generating sensing data revealing said current conditions;
   means for recognizing said current conditions based on said sensing data and for producing recognition information showing a recognition result;
   means for generating meta information based on said sensing data and said recognition information, the meta information including certainty-factor information showing a degree of certainty of said recognition information;
   means for storing temporarily content data as data corresponding to said sensing data and as data representing said current conditions;
   means for producing a result of determination indicating whether said current conditions have changed, based on said certainty-factor information;
   means for recording a content file for displaying or reproducing at least one of a still image, a moving image, and an audio signal, each of which records said current conditions, based on said content data when said result of said determination indicates a change in said current conditions; and
   search means for searching for a content file based on said recognition information, upon the result of determination indicating that said current conditions have changed.

2. The information-processing apparatus according to claim 1, further comprising:
   means for associating the recorded content file with the meta information.

3. The information-processing apparatus according to claim 1, wherein said means for generating generates the meta information as structured information.

4. The information-processing apparatus according to claim 3, further comprising:
   means for computing a weight of said recognition information, the weight of said recognition information representing a priority level of said recognition information based on said certainty-factor information, wherein
   the search means carries out a weighted search for searching for the searched content file, which records past conditions surrounding the information-processing apparatus as conditions similar to said current conditions, the weighted search being based on said recognition information and the weight of said recognition information, and
   said means for generating generates the meta information, which includes said recognition information.

5. The information-processing apparatus according to claim 4, wherein
   said means for producing produces said result of said determination by comparing a first recognition information included in a first meta information with a second recognition information included in a second meta information generated right before said first meta information and using a change of said first recognition information included in said first meta information as a basis of said determination; and
   said means for computing computes the weight, based on said certainty-factor information and a magnitude of said change of said first recognition information.

6. The information-processing apparatus according to claim 4, further comprising:
   means for displaying a still image or a moving image based on the searched content file, wherein said search means searches for another content file having meta information similar to meta information of the searched content file, when the displayed still or moving image is selected.

7. The information-processing apparatus according to claim 4, further comprising:
   means for displaying a still image or a moving image based on the searched content file in an order predetermined based on a weight of the recorded content file, wherein
   said search means computes said weight of the searched content file, said weight of the searched content file representing a priority level of the searched content file based on a search result.

8. An information-processing method, comprising:
   detecting conditions surrounding an apparatus and controlling generation of sensing data revealing the detected conditions;
   recognizing the detected conditions based on said sensing data, and producing recognition information showing a recognition result;
   generating meta information based on said sensing data and said recognition information, the meta information including certainty-factor information showing a degree of certainty of said recognition information;
   storing content data temporarily, as data corresponding to said sensing data and as data representing the detected conditions;
   producing a result of determination indicating whether the detected conditions have changed based on said certainty-factor information;

recording a content file for displaying or reproducing at least one of a still image, a moving image, and an audio signal, each of which records the detected conditions, based on said content data when said result of said determination indicates a change in the detected conditions; and searching for a content file based on said recognition information upon the result of determination indicating that said current conditions have changed.

9. A computer-readable medium storing computer executable instructions, wherein the instructions, when executed by a processor, cause the processor to perform a method, comprising:

detecting conditions surrounding an apparatus and controlling generation of sensing data revealing the detected conditions;

recognizing the detected conditions based on said sensing data, and producing recognition information showing a recognition result;

generating meta information based on said sensing data and said recognition information, the meta information including certainty-factor information showing a degree of certainty of said recognition information;

storing content data temporarily, as data corresponding to said sensing data and as data representing the detected conditions;

producing a result of determination indicating whether the detected conditions have changed based on said certainty-factor information;

recording a content file for displaying or reproducing at least one of a still image, a moving image, and an audio signal, each of which records the detected conditions, based on said content data when said result of said determination indicates a change in the detected conditions; and searching for a content file based on said recognition information upon the result of determination indicating that said current conditions have changed.

10. The information-processing apparatus according to claim 1, wherein said means for producing produces said result of said determination by comparing a first recognition information included in a first meta information with a second recognition information included in a second meta information generated right before said first meta information.

11. An information-processing apparatus, comprising:

a detection unit configured to detect conditions surrounding a user and to generate sensing data revealing said conditions surrounding said user;

a recognition unit configured to recognize said conditions surrounding said user based on said sensing data and to produce recognition information showing a recognition result;

a meta-information generation unit configured to generate meta information for detecting a change in said conditions surrounding said user, the meta information being based on said sensing data and said recognition information; and a weight computation unit configured to compute a weight representing a priority level of said recognition information, based on certainty-factor information and a magnitude of a change in said recognition information.

12. The information-processing apparatus according to claim 1, wherein the means for recording records the content file, a content of the content file being locally generated from the content data.

13. The information-processing apparatus according to claim 1, wherein the means for recording records the content file only when said result of said determination indicates the change in said current conditions.

14. The information-processing apparatus according to claim 1, further comprising:

means for computing a weight of said recognition information, the weight of said recognition information representing a priority level of said recognition information based on said certainty-factor information and a magnitude of a change in said recognition information.

15. The information-processing method according to claim 8, further comprising:

computing a weight of said recognition information, the weight of said recognition information representing a priority level of said recognition information based on said certainty-factor information and a magnitude of a change in said recognition information.

16. The computer-readable medium according to claim 9, wherein the method further comprises:

computing a weight of said recognition information, the weight of said recognition information representing a priority level of said recognition information based on said certainty-factor information and a magnitude of a change in said recognition information.

17. The information-processing apparatus according to claim 1, wherein the means for producing indicates that said current conditions have changed when said certainty-factor information exceeds a predetermined value.

18. The information-processing apparatus according to claim 1, wherein the recognition result indicates one of a person, a location, a spoken word, and a time.

* * * * *